US009497719B2

(12) United States Patent
You et al.

(10) Patent No.: US 9,497,719 B2
(45) Date of Patent: Nov. 15, 2016

(54) USER EQUIPMENT AND METHOD FOR RECEIVING SYNCHRONIZATION SIGNALS, AND BASE STATION AND METHOD FOR TRANSMITTING SYNCHRONIZATION SIGNALS

(71) Applicant: LG Electronics Inc., Seoul (KR)

(72) Inventors: Hyangsun You, Anyang-si (KR); Dongyoun Seo, Anyang-si (KR); Yunjung Yi, Anyang-si (KR); Joonkui Ahn, Anyang-si (KR); Suckchel Yang, Anyang-si (KR)

(73) Assignee: LG ELectronics Inc., Seoul (KR)

( * ) Notice: Subject to any disclaimer, the term of this patent is extended or adjusted under 35 U.S.C. 154(b) by 70 days.

(21) Appl. No.: 14/375,095

(22) PCT Filed: Jan. 29, 2013

(86) PCT No.: PCT/KR2013/000713
§ 371 (c)(1),
(2) Date: Jul. 28, 2014

(87) PCT Pub. No.: WO2013/112032
PCT Pub. Date: Aug. 1, 2013

(65) Prior Publication Data
US 2015/0016339 A1    Jan. 15, 2015

Related U.S. Application Data

(60) Provisional application No. 61/591,965, filed on Jan. 29, 2012, provisional application No. 61/612,957, filed on Mar. 19, 2012, provisional application No. 61/625,683, filed on Apr. 18, 2012.

(51) Int. Cl.
*H04W 4/00* (2009.01)
*H04W 56/00* (2009.01)
(Continued)

(52) U.S. Cl.
CPC ........ *H04W 56/001* (2013.01); *H04J 11/0073* (2013.01); *H04J 11/0076* (2013.01); *H04W 56/0015* (2013.01); *H04B 7/2656* (2013.01); *H04J 2011/0096* (2013.01)

(58) Field of Classification Search
CPC .................... H04W 56/001; H04W 56/0015
See application file for complete search history.

(56) References Cited

U.S. PATENT DOCUMENTS

| 8,625,526 | B2* | 1/2014 | Han | H04L 12/189 370/330 |
| 8,743,785 | B2* | 6/2014 | Qu | H04W 52/244 370/328 |
| 8,902,935 | B2* | 12/2014 | Kim | H04J 11/0079 370/324 |

(Continued)

FOREIGN PATENT DOCUMENTS

| EP | 2219304 | 8/2010 |
| EP | 2239864 | 10/2010 |

(Continued)

*Primary Examiner* — Khaled Kassim
*Assistant Examiner* — Berhanu Belete
(74) *Attorney, Agent, or Firm* — Dentons US LLP

(57) ABSTRACT

The present invention relates to a new type of carrier wave having a different configuration from existing carrier waves. The new type of carrier wave is detected by using at least one of a primary synchronization signal (PSS) and a secondary synchronization signal (SSS). When the new type of carrier wave is formed for detection by using only one of the PSS or the SSS, or by using both of the PSS and SSS, the new type of carrier wave includes PSS and SSS transmissions which are different from existing PSS and SSS transmissions.

20 Claims, 23 Drawing Sheets

(51) Int. Cl.
*H04J 11/00* (2006.01)
*H04B 7/26* (2006.01)

(56) References Cited

U.S. PATENT DOCUMENTS

| | | | | |
|---|---|---|---|---|
| 9,215,054 B2* | 12/2015 | Han | | H04J 11/0079 |
| 2008/0043858 A1* | 2/2008 | Lim | | H04J 11/00 |
| | | | | 375/260 |
| 2010/0290376 A1* | 11/2010 | Dai | | H04L 5/0007 |
| | | | | 370/294 |
| 2010/0296429 A1* | 11/2010 | Han | | H04L 12/189 |
| | | | | 370/312 |
| 2011/0256868 A1* | 10/2011 | Nogami | | H04J 11/0069 |
| | | | | 455/435.1 |
| 2011/0310878 A1* | 12/2011 | Lindoff | | H04J 11/005 |
| | | | | 370/343 |
| 2012/0093267 A1* | 4/2012 | Zhou | | H04W 56/00 |
| | | | | 375/343 |
| 2012/0099565 A1* | 4/2012 | Kim | | H04J 11/0079 |
| | | | | 370/336 |
| 2012/0201218 A1* | 8/2012 | Yamamoto | | H04B 7/269 |
| | | | | 370/329 |
| 2013/0107871 A1* | 5/2013 | Sun | | H04L 27/261 |
| | | | | 370/350 |

FOREIGN PATENT DOCUMENTS

| | | |
|---|---|---|
| KR | 1020090065414 | 6/2009 |
| KR | 1020090115969 | 11/2009 |

* cited by examiner (a)          (b)

(a)

(b)

(a)

(b)

USER EQUIPMENT AND METHOD FOR RECEIVING SYNCHRONIZATION SIGNALS, AND BASE STATION AND METHOD FOR TRANSMITTING SYNCHRONIZATION SIGNALS

This application is a 35 USC §371 National Stage entry of International Application No. PCT/KR2013/000713 filed on Jan. 29, 2013, and claims priority to U.S. Provisional Application No. 61/591,965 filed on Jan. 29, 2012; 61/612, 957 filed on Mar. 19, 2012 and 61/625,683 filed on Apr. 18, 2012, all of which are hereby incorporated by reference in their entireties as if fully set forth herein.

TECHNICAL FIELD

The present invention relates to synchronization of a carrier. The present invention relates to a method and apparatus for transmitting a synchronization signal for carrier synchronization and a method and apparatus for receiving the synchronization signal.

BACKGROUND ART

In a wireless communication system, a user equipment (UE) may receive data and/or various control information from a base station (BS) through downlink (DL) and transmit data and/or various control information to the BS through uplink (UL). In order to communicate with a BS, a UE needs to establish synchronization with the BS. To this end, a UE, which is turned on from a power-off state or newly enters a cell which is a geographic region served by a BS, performs initial cell search accompanying operation such as synchronization establishment with the BS. Upon completion of initial cell search, the UE may receive data and/or control information through a physical downlink channel and transmit data and/or control information through a physical uplink channel.

Due to various reasons including cell search, maintenance of time synchronization after synchronization between a UE and a BS, and correction of a frequency offset, a wireless communication system discussed up to now defines transmission/reception of various mandatory signals on designated radio resources.

The types and number of these mandatory signals have increased with the advance of the wireless communication system. Since signals other than the mandatory signals cannot be allocated to radio resources to which the mandatory signals are allocated, the mandatory signals increasing in accordance with the advance of the wireless communication system hinder the degree of freedom of scheduling of the wireless communication system and also restricts introduction of more efficient communication technology for the wireless communication system.

DETAILED DESCRIPTION OF THE INVENTION

Technical Problems

Recently, configuration of new carriers which are free from restrictions of mandatory signals defined up to now has been considered. A method and/or apparatus for configuring or recognizing the new carriers while maintaining compatibility with an apparatus configured according to a legacy system are needed.

The technical objects that can be achieved through the present invention are not limited to what has been particularly described hereinabove and other technical objects not described herein will be more clearly understood by persons skilled in the art from the following detailed description.

Technical Solutions

In as aspect of the present invention, provided herein is a method for receiving a synchronization signal by a user equipment, the method including acquiring synchronization with a cell carrying a primary synchronization signal (PSS) and a secondary synchronization signal (SSS) (hereinafter, a first cell), using the PSS and the SSS; and detecting another SSS on a frequency different from a frequency of the first cell and acquiring synchronization with a cell carrying the another SSS (hereinafter, a second cell), using the another SSS.

In another aspect of the present invention, provided herein is a user equipment for receiving a synchronization signal in a carrier aggregation configuration, the user equipment including a radio frequency unit; and a processor configured to control the radio frequency unit, wherein the processor is configured to acquire synchronization with a primary cell (PCell) carrying a primary synchronization signal (PSS) and a secondary synchronization signal (SSS), using the PSS and the SSS and the processor is configured to detect another SSS on a frequency different from a frequency of the PCell and acquire synchronization with a secondary cell (SCell) carrying the another SSS, using the another SSS.

In another aspect of the present invention, provided herein is a method for transmitting a synchronization signal by a base station, the method including transmitting a primary synchronization signal (PSS) and a secondary synchronization signal (SSS) through a cell (hereinafter, a first cell); and transmitting another SSS through a cell (hereinafter, a second cell) having a frequency different from a frequency of the first cell.

In another aspect of the present invention, provided herein is a base station for transmitting a synchronization signal, the base station including a radio frequency unit; and a processor configured to control the radio frequency unit, wherein the processor controls the radio frequency unit to transmit a primary synchronization signal (PSS) and a secondary synchronization signal (SSS) through a cell (hereinafter, a first cell) and controls the radio frequency unit to transmit another SSS through a cell (hereinafter, a second cell) having a frequency different from a frequency of the first cell.

In another aspect of the present invention, provided herein is a method for receiving a synchronization signal by a user equipment, the method including acquiring synchronization with a cell carrying a primary synchronization signal (PSS) and a secondary synchronization signal (SSS), using the PSS and the SSS; and determining whether a duplex mode of the cell is time division duplex (TDD) or frequency division duplex (FDD), based on a time distance between the PSS and the SSS.

In another aspect of the present invention, provided herein is a user equipment for receiving a synchronization signal, the user equipment including a radio frequency unit; and a processor configured to control the radio frequency unit, wherein the processor is configured to acquire synchronization with a cell carrying a primary synchronization signal (PSS) and a secondary synchronization signal (SSS), using the PSS and the SSS and to determine whether a duplex mode of the cell is time division duplex (TDD) or frequency division duplex (FDD), based on a time distance between the PSS and the SSS.

In another aspect of the present invention, provided herein is a method for transmitting a synchronization signal by a base station, the method including configuring a duplex mode of a cell as time division duplex (TDD) or frequency division duplex (FDD); and transmitting a primary synchronization signal (PSS) and a secondary synchronization signal (SSS) through the cell so as to have different time durations according to the duplex mode of the cell.

In another aspect of the present invention, provided herein is a base station for transmitting a synchronization signal, the base station including a radio frequency unit; and a processor configured to control the radio frequency unit, wherein the processor configures a duplex mode of a cell as time division duplex (TDD) or frequency division duplex (FDD) and control the radio frequency unit to transmit a primary synchronization signal (PSS) and a secondary synchronization signal (SSS) through the cell so as to have different time durations according to the duplex mode of the cell.

In another aspect of the present invention, provided herein is a method for receiving a synchronization signal by a user equipment, the method including detecting a primary synchronization signal (PSS) and a secondary synchronization signal (SSS) in a subframe; and acquiring synchronization with a cell carrying the PSS and the SSS, wherein the SSS is located on a second OFDM symbol among OFDM symbols of a first slot of the subframe and the SSS is located on a third OFDM symbol among the OFDM symbols of the first slot of the subframe.

In another aspect of the present invention, provided herein is a user equipment for receiving a synchronization signal, the user equipment including a radio frequency unit; and a processor configured to control the radio frequency unit, wherein the processor is configured to detect a primary synchronization signal (PSS) and a secondary synchronization signal (SSS) in a subframe and to acquire synchronization with a cell carrying the PSS and the SSS, and the SSS is located on a second OFDM symbol among OFDM symbols of a first slot of the subframe and the SSS is located on a third OFDM symbol among the OFDM symbols of the first slot of the subframe.

In another aspect of the present invention, provided herein is a method for transmitting a synchronization signal by a base station, the method including transmitting a primary synchronization signal (PSS) and a secondary synchronization signal (SSS) in a subframe through a cell, wherein the SSS is located on a second OFDM symbol among OFDM symbols of a first slot of the subframe and the SSS is located on a third OFDM symbol among the OFDM symbols of the first slot of the subframe.

In another aspect of the present invention, provided herein is a base station for transmitting a synchronization signal, the base station including a radio frequency unit; and a processor configured to control the radio frequency unit, wherein the processor controls the radio frequency unit to transmit a primary synchronization signal (PSS) and a secondary synchronization signal (SSS) in a subframe through a cell, and the SSS is located on a second OFDM symbol among OFDM symbols of a first slot of the subframe and the SSS is located on a third OFDM symbol among the OFDM symbols of the first slot of the subframe.

In each aspect of the present invention, the another SSS may be detected using the PSS of the first cell.

In each aspect of the present invention, a detection interval of the another SSS in the second cell may be different from a detection interval of the SSS in the first cell.

The second cell may carry no PSS.

The first cell may be a primary cell (PCell) and the second cell may be a secondary cell (SCell).

The PSS and the SSS may be detected at an unequal interval.

The PSS and the SSS may be detected on a frequency resource deviating from a center frequency of the cell by a predetermined magnitude.

The PSS and the SSS may be detected in different orders according to the duplex mode of the cell.

The PSS and the SSS may be detected in different orders according to a type of a cyclic prefix of the second cell.

The above technical solutions are merely some parts of the embodiments of the present invention and various embodiments into which the technical features of the present invention are incorporated can be derived and understood by persons skilled in the art from the following detailed description of the present invention.

Advantageous Effects

According to the present invention, new carriers which are free from restrictions of mandatory signals of a legacy system while maintaining compatibility with a legacy system can be configured.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention, illustrate embodiments of the invention and together with the description serve to explain the principle of the invention.

MODE FOR INVENTION

Figure 1:
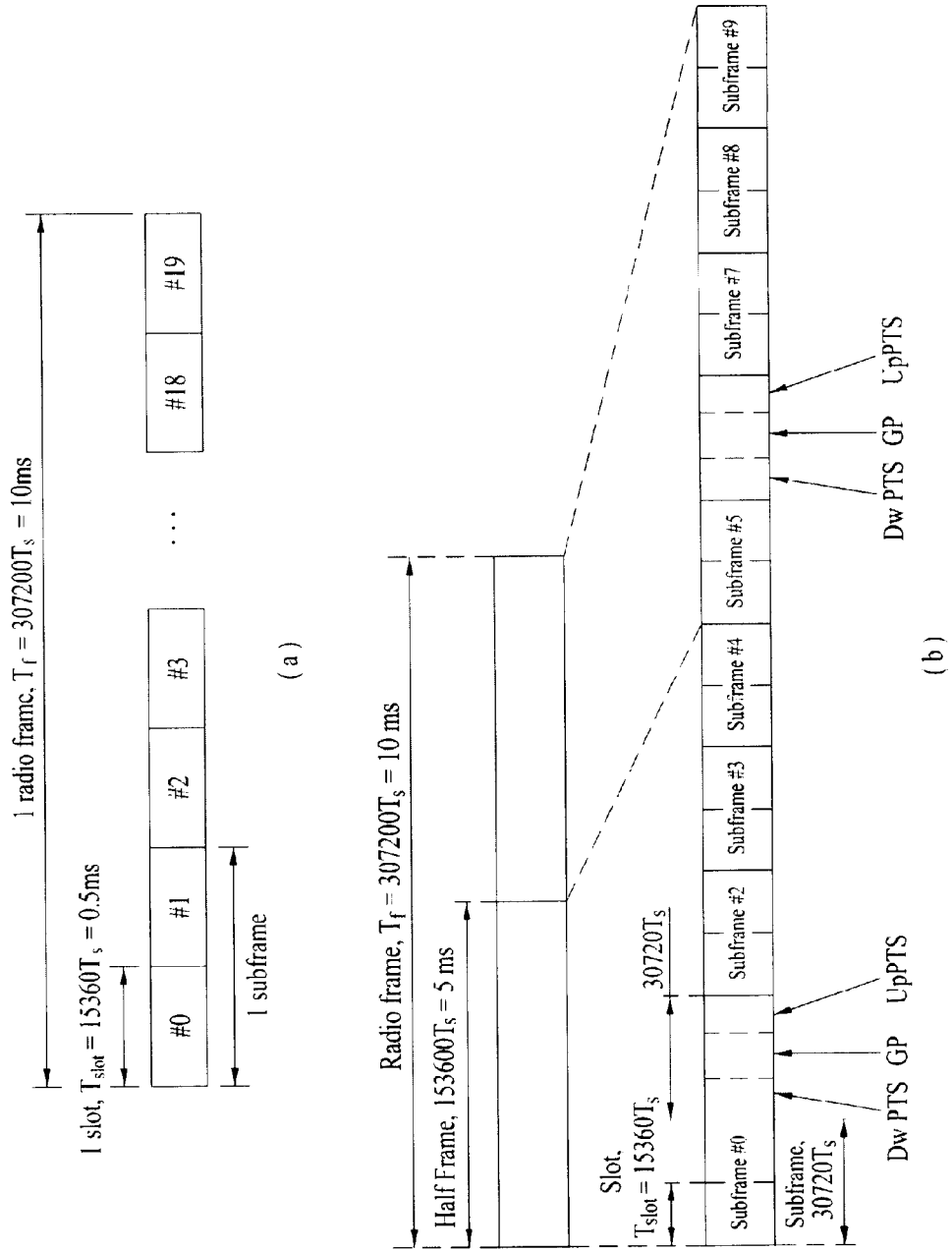
FIG. 1 illustrates the structure of a radio frame used in a wireless communication system.

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

In some instances, known structures and devices are omitted or are shown in block diagram form, focusing on important features of the structures and devices, so as not to obscure the concept of the present invention. The same reference numbers will be used throughout this specification to refer to the same or like parts.

For convenience of description, while detailed embodiments of the present invention will be described based on 3rd generation partnership project (3GPP) long term evolution (LTE) or 3GPP LTE-advanced (LTE-A), the present invention is applicable to other wireless communication systems as well as an LTE/LTE-A system.

Hereinafter, detailed embodiments of the present invention will be described by referring to a carrier configured according to legacy wireless communication standards as a legacy carrier type (LCT) carrier, an LCT component carrier (CC), or a normal carrier and referring to a carrier configured according to fewer restrictions relative to restrictions of the LCT carrier as a new carrier type (NCT) carrier, an NCT CC, or an extended carrier.

In the present invention, a user equipment (UE) may be a fixed or mobile device. Examples of the UE include various devices that transmit and receive user data and/or various kinds of control information to and from a base station (BS). The UE may be referred to as a terminal equipment (TE), a mobile station (MS), a mobile terminal (MT), a user terminal (UT), a subscriber station (SS), a wireless device, a personal digital assistant (PDA), a wireless modem, a handheld device, etc. In addition, in the present invention, a BS generally refers to a fixed station that performs communication with a UE and/or another BS, and exchanges various kinds of data and control information with the UE and another BS. The BS may be referred to as an advanced base station (ABS), a node-B (NB), an evolved node-B (eNB), a base transceiver system (BTS), an access point (AP), a processing server (PS), etc. In describing the present invention, a BS will be referred to as an eNB.

In the present invention, a node refers to a fixed point capable of transmitting/receiving a radio signal through communication with a UE. Various types of eNBs may be used as nodes irrespective of the terms thereof. For example, a BS, a node B (NB), an e-node B (eNB), a pico-cell eNB (PeNB), a home eNB (HeNB), a relay, a repeater, etc. may be a node. In addition, a node may not be an eNB. For example, a radio remote head (RRH) or a radio remote unit (RRU) may be a node. The RRH or RRU generally has a lower power level than a power level of an eNB. Since the RRH or RRU (hereinafter, RRH/RRU) is generally connected to the eNB through a dedicated line such as an optical cable, cooperative communication between RRH/RRU and the eNB can be smoothly performed in comparison with cooperative communication between eNBs connected by a radio link. At least one antenna is installed per node. The antenna may mean a physical antenna, an antenna port, a virtual antenna, or an antenna group. A node may be referred to as a point.

In the present invention, a cell refers to a prescribed geographical area to which one or more nodes provide a communication service. Accordingly, in the present invention, communicating with a specific cell may mean communicating with an eNB or a node which provides a communication service to the specific cell. In addition, a downlink/uplink signal of a specific cell refers to a downlink/uplink signal from/to an eNB or a node which provides a communication service to the specific cell. Furthermore, channel status/quality of a specific cell refers to channel status/quality of a channel or communication link formed between an eNB or node which provides a communication service to the specific cell and a UE. In a 3GPP LTE-A based system, the UE may measure a downlink channel state from a specific node using channel state information-reference signal(s) (CSI-RS(s)) transmitted on a CSI-RS resource allocated to the specific node by antenna port(s) of the specific node. Meanwhile, a 3GPP LTE/LTE-A system uses the concept of a cell in order to manage radio resources and a cell associated with the radio resources is distinguished from a cell of a geographic region. The cell associated with the radio resources will be described later with reference to FIG. 8.

3GPP LTE/LTE-A standards define DL physical channels corresponding to resource elements carrying information derived from a higher layer and DL physical signals corresponding to resource elements which are used by a physical layer but which do not carry information derived from a higher layer. For example, a physical downlink shared channel (PDSCH), a physical broadcast channel (PBCH), a physical multicast channel (PMCH), a physical control format indicator channel (PCFICH), a physical downlink control channel (PDCCH), and a physical hybrid ARQ indicator channel (PHICH) are defined as the DL physical channels, and a reference signal and a synchronization signal are defined as the DL physical signals. A reference signal (RS), also called a pilot, refers to a special waveform of a predefined signal known to both a BS and a UE. For example, a cell-specific RS (CRS), a UE-specific RS, a positioning RS (PRS), and channel state information RS (CSI-RS) may be defined as DL RSs. Meanwhile, the 3GPP LTE/LTE-A standards define UL physical channels corresponding to resource elements carrying information derived from a higher layer and UL physical signals corresponding to resource elements which are used by a physical layer but which do not carry information derived from a higher layer. For example, a physical uplink shared channel (PUSCH), a physical uplink control channel (PUCCH), and a physical random access channel (PRACH) are defined as the UL physical channels, and a demodulation reference signal (DM RS) for a UL control/data signal and a sounding reference signal (SRS) used for UL channel measurement are defined as the UL physical signals.

RSs may be divided into common RSs (CRSs) and dedicated RSs (DRSs) depending upon whether RSs are dedicated to a specific UE or UE group. A CRS and a CSI-RS which are commonly used by all UEs in a cell may be categorized into the CRSs and a DMRS, a UE-specific RS, and an SRS which are dedicated to a specific UE or UE group may be categorized into the DRSs.

In the present invention, a physical downlink control channel (PDCCH), a physical control format indicator channel (PCFICH), a physical hybrid automatic retransmit request indicator channel (PHICH), and a physical downlink shared channel (PDSCH) refer to a set of time-frequency resources or resource elements (REs) carrying downlink control information (DCI), a set of time-frequency resources or REs carrying a control format indicator (CFI), a set of time-frequency resources or REs carrying downlink acknowledgement (ACK)/negative ACK (NACK), and a set of time-frequency resources or REs carrying downlink data, respectively. In addition, a physical uplink control channel (PUCCH), a physical uplink shared channel (PUSCH) and a physical random access channel (PRACH) refer to a set of time-frequency resources or REs carrying uplink control information (UCI), a set of time-frequency resources or REs carrying uplink data and a set of time-frequency resources or REs carrying random access signals, respectively. In the present invention, in particular, a time-frequency resource or RE that is assigned to or belongs to PDCCH/PCFICH/PHICH/PDSCH/PUCCH/PUSCH/PRACH is referred to as PDCCH/PCFICH/PHICH/PDSCH/PUCCH/PUSCH/PRACH RE or PDCCH/PCFICH/PHICH/PDSCH/PUCCH/PUSCH/PRACH time-frequency resource, respectively. Therefore, in the present invention, PUCCH/PUSCH/PRACH transmission of a UE is conceptually identical to UCI/uplink data/random access signal transmission on PUSCH/PUCCH/PRACH, respectively. In addition, PDCCH/PCFICH/PHICH/PDSCH transmission of an eNB is conceptually identical to downlink data/DCI transmission on PDCCH/PCFICH/PHICH/PDSCH, respectively.

Hereinbelow, an OFDM symbol/subcarrier/RE to or for which a CRS/DMRS/CSI-RS/SRS/UE-specific RS is allocated or configured will be referred to as a CRS/DMRS/CSI-RS/SRS/UE-specific RS symbol/carrier/subcarrier/RE. For instance, a symbol to which a CSI-RS is allocated is referred to as a CSI-RS symbol, a subcarrier to which a CSI-RS is allocated is referred to as a CSI-RS subcarrier, and an RE to which a CSI-RS is allocated is referred to as a CSI-RS RE. In addition, a subframe configured for CSI-RS transmission is referred to as a CRS-RS subframe. Furthermore, a subframe in which a broadcast signal is transmitted is referred to as a broadcast subframe or a PBCH subframe and a subframe in which a synchronization signal (e.g. a PSS and/or an SSS) is transmitted is referred to as a synchronization signal subframe or a PSS/SSS subframe. An OFDM symbol/subcarrier/RE to or for which a PSS/SSS is allocated or configured is referred to as a PSS/SSS symbol/subcarrier/RE.

FIG. 1 illustrates the structure of a radio frame used in a wireless communication system.

Specifically, FIG. 1(a) illustrates an exemplary structure of a radio frame which can be used in frequency division multiplexing (FDD) in 3GPP LTE/LTE-A and FIG. 1(b) illustrates an exemplary structure of a radio frame which can be used in time division multiplexing (TDD) in 3GPP LTE/LTE-A.

Referring to FIG. 1, a 3GPP LTE/LTE-A radio frame is 10 ms (307,200$T_s$) in duration. The radio frame is divided into 10 subframes of equal size. Subframe numbers may be assigned to the 10 subframes within one radio frame, respectively. Here, $T_s$ denotes sampling time where $T_s=1/(2048*15$ kHz). Each subframe is 1 ms long and further divided into two slots. 20 slots are sequentially numbered from 0 to 19 in one radio frame. Duration of each slot is 0.5 ms. A time interval in which one subframe is transmitted is defined as a transmission time interval (TTI). Time resources may be distinguished by a radio frame number (or radio frame index), a subframe number (or subframe index), a slot number (or slot index), and the like.

A radio frame may have different configurations according to duplex modes. In FDD mode for example, since downlink (DL) transmission and uplink (UL) transmission are discriminated according to frequency, a radio frame for a specific frequency band operating on a carrier frequency includes either DL subframes or UL subframes. In TDD mode, since DL transmission and UL transmission are discriminated according to time, a radio frame for a specific frequency band operating on a carrier frequency includes both DL subframes and UL subframes.

Table 1 shows an exemplary UL-DL configuration within a radio frame in TDD mode.

TABLE 1

| DL-UL config-uration | Down-link-to-Uplink switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a DL subframe, U denotes a UL subframe, and S denotes a special subframe. The special subframe includes three fields, i.e. downlink pilot time slot (DwPTS), guard period (GP), and uplink pilot time slot (UpPTS). DwPTS is a time slot reserved for DL transmission and UpPTS is a time slot reserved for UL transmission. Table 2 shows an example of the special subframe configuration.

TABLE 2

|                                  |              | Normal cyclic prefix in downlink |                              |              | Extended cyclic prefix in downlink |                              |
|                                  |              | UpPTS                            |                              |              | UpPTS                              |                              |
| Special subframe configuration   | DwPTS        | Normal cyclic prefix in uplink   | Extended cyclic prefix in uplink | DwPTS    | Normal cyclic prefix in uplink     | Extended cyclic prefix in uplink |
|---|---|---|---|---|---|---|
| 0 | $6592 \cdot T_s$  | $2192 \cdot T_s$ | $2560 \cdot T_s$ | $7680 \cdot T_s$  | $2192 \cdot T_s$ | $2560 \cdot T_s$ |
| 1 | $19760 \cdot T_s$ |                  |                  | $20480 \cdot T_s$ |                  |                  |
| 2 | $21952 \cdot T_s$ |                  |                  | $23040 \cdot T_s$ |                  |                  |
| 3 | $24144 \cdot T_s$ |                  |                  | $25600 \cdot T_s$ |                  |                  |
| 4 | $26336 \cdot T_s$ |                  |                  | $7680 \cdot T_s$  | $4384 \cdot T_s$ | $5120 \cdot T_s$ |
| 5 | $6592 \cdot T_s$  | $4384 \cdot T_s$ | $5120 \cdot T_s$ | $20480 \cdot T_s$ |                  |                  |
| 6 | $19760 \cdot T_s$ |                  |                  | $23040 \cdot T_s$ |                  |                  |
| 7 | $21952 \cdot T_s$ |                  |                  | —                 | —                | —                |
| 8 | $24144 \cdot T_s$ |                  |                  | —                 | —                | —                |

Figure 2:
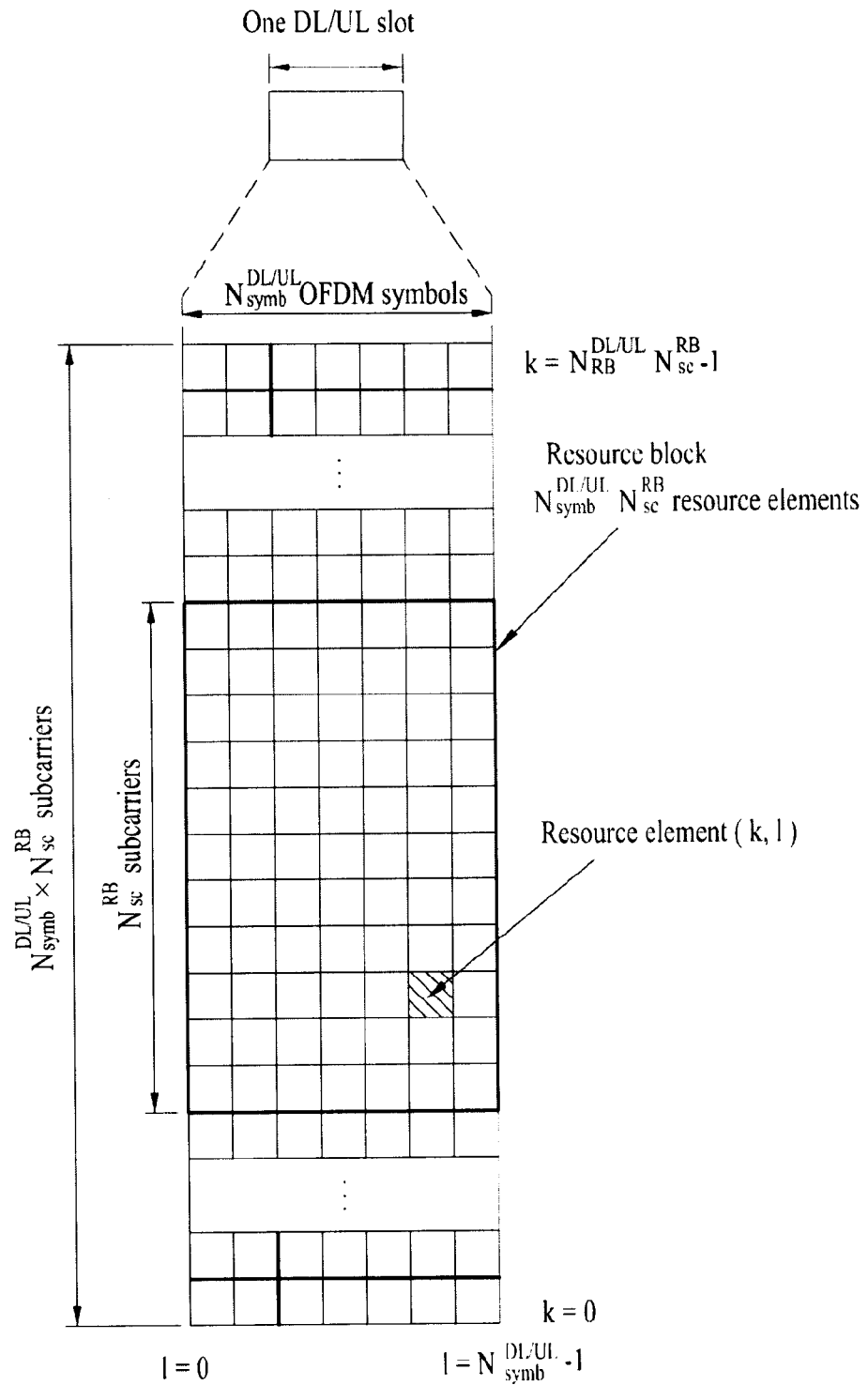
FIG. 2 illustrates the structure of a downlink (DL)/uplink (UL) slot in a wireless communication system.

FIG. 2 illustrates the structure of a DL/UL slot structure in a wireless communication system. In particular, FIG. 2 illustrates the structure of a resource grid of a 3GPP LTE/LTE-A system. One resource grid is defined per antenna port.

Referring to FIG. 2, a slot includes a plurality of orthogonal frequency division multiplexing (OFDM) symbols in the time domain and includes a plurality of resource blocks (RBs) in the frequency domain. The OFDM symbol may refer to one symbol duration. Referring to FIG. 2, a signal transmitted in each slot may be expressed by a resource grid including $N^{DL/UL}_{RB} * N^{RB}_{sc}$ subcarriers and $N^{DL/UL}_{symb}$ OFDM symbols. $N^{DL}_{RB}$ denotes the number of RBs in a DL slot and $N^{UL}_{RB}$ denotes the number of RBs in a UL slot. $N^{DL}_{RB}$ and $N^{UL}_{RB}$ depend on a DL transmission bandwidth and a UL transmission bandwidth, respectively. $N^{DL}_{symb}$ denotes the number of OFDM symbols in a DL slot, $N^{UL}_{symb}$ denotes the number of OFDM symbols in a UL slot, and $N^{RB}_{sc}$ denotes the number of subcarriers configuring one RB.

An OFDM symbol may be referred to as an OFDM symbol, an SC-FDM symbol, etc. according to multiple access schemes. The number of OFDM symbols included in one slot may be varied according to channel bandwidths and CP lengths. For example, in a normal cyclic prefix (CP) case, one slot includes 7 OFDM symbols. In an extended CP case, one slot includes 6 OFDM symbols. Although one slot of a subframe including 7 OFDM symbols is shown in FIG. 2 for convenience of description, embodiments of the present invention are similarly applicable to subframes having a different number of OFDM symbols. Referring to FIG. 2, each OFDM symbol includes $N^{DL/UL}_{RB} * N^{RB}_{sc}$ subcarriers in the frequency domain. The type of the subcarrier may be divided into a data subcarrier for data transmission, a reference signal (RS) subcarrier for RS transmission, and a null subcarrier for a guard band and a DC component. The null subcarrier for the DC component is unused and is mapped to a carrier frequency $f_0$ in a process of generating an OFDM signal or in a frequency up-conversion process. The carrier frequency is also called a center frequency.

One RB is defined as $N^{DL/UL}_{symb}$ (e.g. 7) consecutive OFDM symbols in the time domain and as $N^{RB}_{sc}$ (e.g. 12) consecutive subcarriers in the frequency domain. For reference, a resource composed of one OFDM symbol and one subcarrier is referred to a resource element (RE) or tone. Accordingly, one RB includes $N^{DL/UL}_{symb} * N^{RB}_{sc}$ REs. Each RE within a resource grid may be uniquely defined by an index pair (k, l) within one slot. k is an index ranging from 0 to $N^{DL/UL}_{RB} * N^{RB}_{sc} - 1$ in the frequency domain, and l is an index ranging from 0 to $N^{DL/UL}_{symb} - 1$ in the time domain.

Meanwhile, one RB is mapped to one physical resource block (PRB) and one virtual resource block (VRB). A PRB is defined as $N^{DL}_{symb}$ (e.g. 7) consecutive OFDM symbols in the time domain and $N^{RB}_{sc}$ (e.g. 12) consecutive subcarriers in the frequency domain. Accordingly, one PRB is configured with $N^{DL/UL}_{symb} * N^{RB}_{sc}$ REs. In one subframe, two RBs each located in two slots of the subframe while occupying the same $N^{RB}_{sc}$ consecutive subcarriers are referred to as a physical resource block (PRB) pair. Two RBs configuring a PRB pair have the same PRB number (or the same PRB index).

In order for a UE to receive a signal from an eNB or transmit a signal to the eNB, the UE should be synchronized with the eNB in time/frequency. This is because the UE can determine time and frequency parameters necessary for performing demodulation of a DL signal and transmission of a UL signal at an accurate time only after the UE is synchronized with the eNB.

Figure 3:
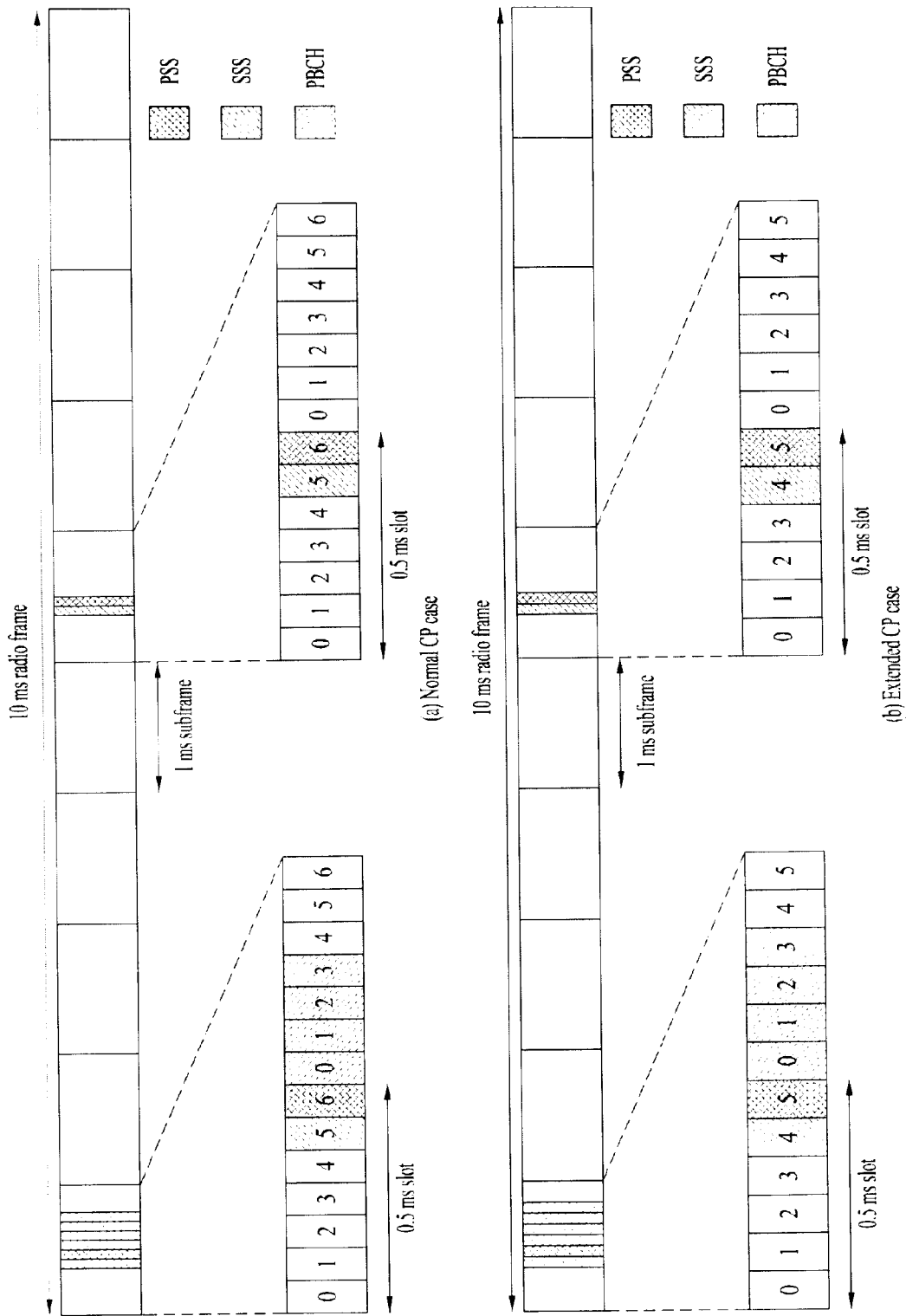
FIG. 3 illustrates a radio frame structure for transmission of a synchronization signal (SS).

FIG. 3 illustrates a radio frame structure for transmission of a synchronization signal (SS). Specifically, FIG. 3 illustrates a radio frame structure for transmission of an SS and a PBCH in frequency division duplex (FDD), wherein FIG. 3(a) illustrates transmission locations of an SS and a PBCH in a radio frame configured as a normal cyclic prefix (CP) and FIG. 3(b) illustrates transmission locations of an SS and a PBCH in a radio frame configured as an extended CP.

If a UE is powered on or newly enters a cell, the UE performs an initial cell search procedure of acquiring time and frequency synchronization with the cell and detecting a physical cell identity of the cell. To this end, the UE may establish synchronization with the eNB by receiving synchronization signals, e.g. a primary synchronization signal (PSS) and a secondary synchronization signal (SSS), from the eNB and obtain information such as a cell identity (ID).

An SS will be described in more detail with reference to FIG. 3. An SS is categorized into a PSS and an SSS. The PSS is used to acquire time-domain synchronization of OFDM symbol synchronization, slot synchronization, etc. and/or frequency-domain synchronization and the SSS is used to acquire frame synchronization, a cell group ID, and/or CP configuration of a cell (i.e. information as to whether a normal CP is used or an extended CP is used). Referring to FIG. 3, each of a PSS and an SSS is transmitted on two OFDM symbols of every radio frame. More specifically, SSs are transmitted in the first slot of subframe 0 and the first slot of subframe 5, in consideration of a global system for mobile communication (GSM) frame length of 4.6 ms for facilitation of inter-radio access technology (inter-RAT) measurement. Especially, a PSS is transmitted on the last OFDM symbol of the first slot of subframe 0 and on the last OFDM symbol of the first slot of subframe 5 and an SSS is transmitted on the second to last OFDM symbol of the first slot of subframe 0 and on the second to last OFDM symbol of the first slot of subframe 5. A boundary of a corresponding radio frame may be detected through the SSS. The PSS is transmitted on the last OFDM symbol of a corresponding slot and the SSS is transmitted on an OFDM symbol immediately before an OFDM symbol on which the PSS is transmitted. A transmit diversity scheme of an SS uses only a single antenna port and standards therefor are not separately defined. That is, a single antenna port transmission scheme or a transmission scheme transparent to a UE (e.g. precoding vector switching (PVS), time switched transmit diversity (TSTD), or cyclic delay diversity (CDD)) may be used for transmit diversity of an SS.

An SS may represent a total of 504 unique physical layer cell IDs by a combination of 3 PSSs and 168 SSSs. In other words, the physical layer cell IDs are divided into 168 physical layer cell ID groups each including three unique IDs so that each physical layer cell ID is a part of only one physical layer cell ID group. Accordingly, a physical layer cell ID $N^{cell}_{ID}$ $(=3N^{(1)}_{ID}+N^{(2)}_{ID})$ is uniquely defined as number $N^{(1)}_{ID}$ in the range of 0 to 167 indicating a physical layer cell ID group and number $N^{(2)}_{ID}$ from 0 to 2 indicating the physical layer ID in the physical layer cell ID group. A UE may be aware of one of three unique physical layer IDs by detecting the PSS and may be aware of one of 168 physical layer cell IDs associated with the physical layer ID by detecting the SSS. A length-63 Zadoff-Chu (ZC) sequence is defined in the frequency domain and is used as the PSS. As an example, the ZC sequence may be defined by the following equation.

$$d_u(n) = e^{-j\frac{\pi u n(n+1)}{N_{ZC}}}$$ [Equation 1]

where $N_{ZC}$=63 and a sequence element corresponding to a DC subcarrier, n=31, is punctured.

The PSS is mapped to 6 RBs (=72 subcarriers) near to a center frequency. Among the 72 subcarriers, 9 remaining subcarriers carry a value of always 0 and serve as elements facilitating filter design for performing synchronization. To define a total of three PSSs, u=24, 29, and 34 are used in Equation 1. Since u=24 and u=34 have a conjugate symmetry relation, two correlations may be simultaneously performed. Here, conjugate symmetry indicates the relationship of the following Equation.

$d_u(n)=(-1)^n(d_{N_{ZC}-u}(n))^*$, when $N_{ZC}$ is even number $d_u(n)=(d_{N_{ZC}-u}(n))^*$, when $N_{ZC}$ is odd number [Equation 2]

A one-shot correlator for u=29 and u=34 may be implemented using the characteristics of conjugate symmetry. The entire amount of calculation can be reduced by about 33.3% as compared with the case without conjugate symmetry.

In more detail, a sequence d(n) used for a PSS is generated from a frequency-domain ZC sequence as follows.

$$d_u(n) = \begin{cases} e^{-j\frac{\pi u n(n+1)}{63}} & n = 0, 1, \ldots, 30 \\ e^{-j\frac{\pi u(n+1)(n+2)}{63}} & n = 31, 32, \ldots, 61 \end{cases}$$ [Equation 3]

In Equation 3, the Zadoff-Chu root sequence index u is given by the following table.

TABLE 3

| $N_{ID}^{(2)}$ | Root index u |
|---|---|
| 0 | 25 |
| 1 | 29 |
| 2 | 34 |

Referring to FIG. 3, upon detecting a PSS, a UE may discern that a corresponding subframe is one of subframe 0 and subframe 5 because the PSS is transmitted every 5 ms but the UE cannot discern whether the subframe is subframe 0 or subframe 5. Accordingly, the UE cannot recognize the boundary of a radio frame only by the PSS. That is, frame synchronization cannot be acquired only by the PSS. The UE detects the boundary of a radio frame by detecting an SSS which is transmitted twice in one radio frame with different sequences.

Figure 4:
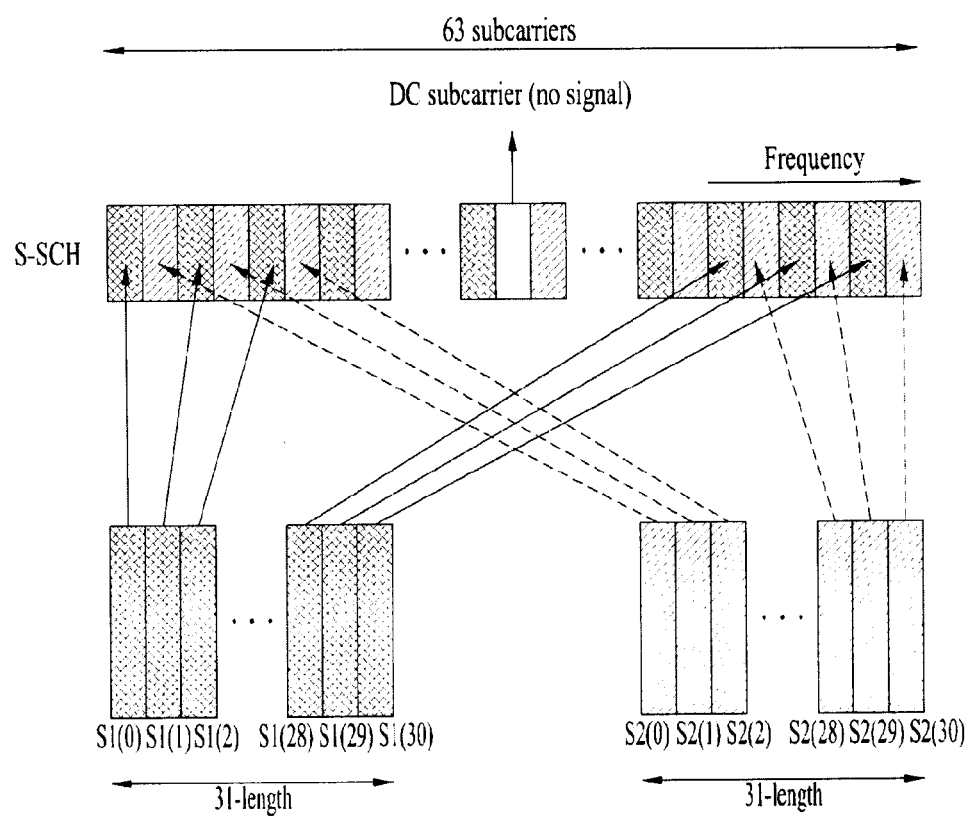
FIG. 4 illustrates a secondary synchronization signal (SSS) generation scheme.

FIG. 4 illustrates an SSS generation scheme. Specifically, FIG. 4 illustrates a relationship of mapping of two sequences in a logical domain to sequences in a physical domain.

A sequence used for the SSS is an interleaved concatenation of two length-31 m-sequences of and the concatenated sequence is scrambled by a scrambling sequence given by a PSS. Here, an m-sequence is a type of a pseudo noise (PN) sequence.

Referring to FIG. 4, if two m-sequences used for generating an SSS code are S1 and S2, then two different PSS-based sequences S1 and S2 are scrambled into the SSS. In this case, S1 and S2 are scrambled by different sequences. A PSS-based scrambling code may be obtained by cyclically shifting an m-sequence generated from a polynomial of $x^5+x^3+1$ and 6 sequences are generated by cyclic shift of the m-sequence according to an index of a PSS. Next, S2 is scrambled by an S1-based scrambling code. The S1-based scrambling code may be obtained by cyclically shifting an m-sequence generated from a polynomial of $x^5+x^4+x^2+x^1+1$ and 8 sequences are generated by cyclic shift of the m-sequence according to an index of S1. The SSS code is swapped every 5 ms, whereas the PSS-based scrambling code is not swapped. For example, assuming that an SSS of subframe 0 carries a cell group ID by a combination of (S1, S2), an SSS of subframe 5 carries a sequence swapped as (S2, S1). Hence, a boundary of a radio frame of 10 ms can be discerned. In this case, the used SSS code is generated from a polynomial of $x^5+x^2+1$ and a total of 31 codes may be generated by different cyclic shifts of an m-sequence of length-31.

A combination of two length-31 m-sequences for defining the SSS is different in subframe 0 and subframe 5 and a total of 168 cell group IDs are expressed by a combination of the two length-31 m-sequences. The m-sequences used as sequences of the SSS have a robust property in a frequency selective environment. In addition, since the m-sequences can be transformed by high-speed m-sequence transform using fast Hadamard transform, if the m-sequences are used as the SSS, the amount of calculation necessary for a UE to interpret the SSS can be reduced. Since the SSS is configured by two short codes, the amount of calculation of the UE can be reduced.

Generation of the SSS will now be described in more detail. A sequence $d(0), \ldots, d(61)$ used for the SSS is an interleaved concatenation of two length-31 binary sequences. The concatenated sequence is scrambled by a sequence given by the PSS.

A combination of two length-31 sequences for defining the PSS becomes different in subframe 0 and subframe 5 according to the following.

$$d(2n) = \begin{cases} s_0^{(m_0)}(n)c_0(n) & \text{in subframe 0} \\ s_1^{(m_1)}(n)c_0(n) & \text{in subframe 5} \end{cases} \quad \text{[Equation 4]}$$

$$d(2n+1) = \begin{cases} s_1^{(m_1)}(n)c_1(n)z_1^{(m_0)}(n) & \text{in subframe 0} \\ s_0^{(m_0)}(n)c_1(n)z_1^{(m_1)}(n) & \text{in subframe 5} \end{cases}$$

In Equation 4, $0 \leq n \leq 30$. The indices $m_0$ and $m_1$ are derived from the physical-layer cell-identity group $N^{(1)}_{ID}$ according to the following.

$$m_0 = m' \bmod 31 \quad \text{[Equation 5]}$$
$$m_1 = (m_0 + \lfloor m'/31 \rfloor + 1) \bmod 31$$
$$m' = N^{(1)}_{ID} + q(q+1)/2,$$
$$q = \left\lfloor \frac{N^{(1)}_{ID} + q'(q'+1)/2}{30} \right\rfloor,$$
$$q' = \lfloor N^{(1)}_{ID}/30 \rfloor$$

The output of Equation 5 is listed in Table 4 following Equation 11.

The two sequences $s^{(m0)}_0(n)$ and $s^{(m1)}_1(n)$ are defined as two different cyclic shifts of the m-sequence $s(n)$.

$$s_0^{(m0)}(n) = s((n+m_0) \bmod 31)$$
$$s_1^{(m1)}(n) = s((n+m_1) \bmod 31) \quad \text{[Equation 6]}$$

In Equation 6, $s(i)=1-2x(i)$, $0 \leq i \leq 30$, is defined by the following equation with initial conditions $x(0)=0$, $x(1)=0$, $x(2)$, $x(3)=0$, $x(4)=1$.

$$x(\bar{i}+5) = (x(\bar{i}+3)+x(\bar{i})) \bmod 2, \; 0 \leq \bar{i} \leq 25 \quad \text{[Equation 7]}$$

The two scrambling sequences $c_0(n)$ and $c_1(n)$ depend on the PSS and are defined by two different cyclic shifts of the m-sequence $c(n)$ according to the following equation.

$$c_0(n) = c((n+N_{ID}^{(2)}) \bmod 31)$$
$$c_1(n) = c((n+N_{ID}^{(2)}+3) \bmod 31) \quad \text{[Equation 8]}$$

In Equation 8, $N^{(2)}_{ID} \in \{0, 1, 2\}$ is the physical-layer identity within the physical-layer cell identity group $N^{(1)}_{ID}$ and $c(i)=1-2x(i)$ ($0 \leq i \leq 30$), is defined by the following equation with initial conditions $x(0)=0$, $x(1)=0$, $x(2)$, $x(3)=0$, $x(4)=1$.

$$x(\bar{i}+5) = (x(\bar{i}+3)+x(\bar{i})) \bmod 2, \; 0 \leq \bar{i} \leq 25 \quad \text{[Equation 9]}$$

The scrambling sequences $z^{(m0)}_1(n)$ and $z^{(m1)}_1(n)$ are defined by a cyclic shift of the m-sequence $z(n)$ according to the following equation.

$$z_1^{(m0)}(n) = z((n+(m_0 \bmod 8)) \bmod 31)$$
$$z_1^{(m1)}(n) = z((n+(m_1 \bmod 8)) \bmod 31) \quad \text{[Equation 10]}$$

In Equation 10, $m_0$ and $m_1$ are obtained from Table 4 following Equation 11 and $z(i)=1-2x(i)$, $0 \leq i \leq 30$, is defined by the following equation with initial conditions $x(0)=0$, $x(1)=0$, $x(2)$, $x(3)=0$, $x(4)=1$.

$$x(\bar{i}+5) = (x(\bar{i}+4)+x(\bar{i}+2)+x(\bar{i}+1)+x(\bar{i})) \bmod 2, \; 0 \leq \bar{i} \leq 25 \quad \text{[Equation 11]}$$

TABLE 4

| $N_{ID}^{(1)}$ | $m_0$ | $m_1$ |
| --- | --- | --- |
| 0 | 0 | 1 |
| 1 | 1 | 2 |
| 2 | 2 | 3 |
| 3 | 3 | 4 |
| 4 | 4 | 5 |
| 5 | 5 | 6 |
| 6 | 6 | 7 |
| 7 | 7 | 8 |
| 8 | 8 | 9 |
| 9 | 9 | 10 |
| 10 | 10 | 11 |
| 11 | 11 | 12 |
| 12 | 12 | 13 |
| 13 | 13 | 14 |
| 14 | 14 | 15 |
| 15 | 15 | 16 |
| 16 | 16 | 17 |
| 17 | 17 | 18 |
| 18 | 18 | 19 |
| 19 | 19 | 20 |
| 20 | 20 | 21 |
| 21 | 21 | 22 |
| 22 | 22 | 23 |
| 23 | 23 | 24 |
| 24 | 24 | 25 |
| 25 | 25 | 26 |
| 26 | 26 | 27 |
| 27 | 27 | 28 |
| 28 | 28 | 29 |
| 29 | 29 | 30 |
| 30 | 0 | 2 |
| 31 | 1 | 3 |
| 32 | 2 | 4 |
| 33 | 3 | 5 |
| 34 | 4 | 6 |
| 35 | 5 | 7 |
| 36 | 6 | 8 |
| 37 | 7 | 9 |
| 38 | 8 | 10 |
| 39 | 9 | 11 |
| 40 | 10 | 12 |
| 41 | 11 | 13 |
| 42 | 12 | 14 |
| 43 | 13 | 15 |
| 44 | 14 | 16 |
| 45 | 15 | 17 |
| 46 | 16 | 18 |
| 47 | 17 | 19 |
| 48 | 18 | 20 |
| 49 | 19 | 21 |
| 50 | 20 | 22 |
| 51 | 21 | 23 |
| 52 | 22 | 24 |
| 53 | 23 | 25 |
| 54 | 24 | 26 |
| 55 | 25 | 27 |
| 56 | 26 | 28 |
| 57 | 27 | 29 |
| 58 | 28 | 30 |
| 59 | 0 | 3 |
| 60 | 1 | 4 |
| 61 | 2 | 5 |
| 62 | 3 | 6 |
| 63 | 4 | 7 |
| 64 | 5 | 8 |
| 65 | 6 | 9 |
| 66 | 7 | 10 |
| 67 | 8 | 11 |
| 68 | 9 | 12 |

TABLE 4-continued

| $N_{ID}^{(1)}$ | $m_0$ | $m_1$ |
|---|---|---|
| 69 | 10 | 13 |
| 70 | 11 | 14 |
| 71 | 12 | 15 |
| 72 | 13 | 16 |
| 73 | 14 | 17 |
| 74 | 15 | 18 |
| 75 | 16 | 19 |
| 76 | 17 | 20 |
| 77 | 18 | 21 |
| 78 | 19 | 22 |
| 79 | 20 | 23 |
| 80 | 21 | 24 |
| 81 | 22 | 25 |
| 82 | 23 | 26 |
| 83 | 24 | 27 |
| 84 | 25 | 28 |
| 85 | 26 | 29 |
| 86 | 27 | 30 |
| 87 | 0 | 4 |
| 88 | 1 | 5 |
| 89 | 2 | 6 |
| 90 | 3 | 7 |
| 91 | 4 | 8 |
| 92 | 5 | 9 |
| 93 | 6 | 10 |
| 94 | 7 | 11 |
| 95 | 8 | 12 |
| 96 | 9 | 13 |
| 97 | 10 | 14 |
| 98 | 11 | 15 |
| 99 | 12 | 16 |
| 100 | 13 | 17 |
| 101 | 14 | 18 |
| 102 | 15 | 19 |
| 103 | 16 | 20 |
| 104 | 17 | 21 |
| 105 | 18 | 22 |
| 106 | 19 | 23 |
| 107 | 20 | 24 |
| 108 | 21 | 25 |
| 109 | 22 | 26 |
| 110 | 23 | 27 |
| 111 | 24 | 28 |
| 112 | 25 | 29 |
| 113 | 26 | 30 |
| 114 | 0 | 5 |
| 115 | 1 | 6 |
| 116 | 2 | 7 |
| 117 | 3 | 8 |
| 118 | 4 | 9 |
| 119 | 5 | 10 |
| 120 | 6 | 11 |
| 121 | 7 | 12 |
| 122 | 8 | 13 |
| 123 | 9 | 14 |
| 124 | 10 | 15 |
| 125 | 11 | 16 |
| 126 | 12 | 17 |
| 127 | 13 | 18 |
| 128 | 14 | 19 |
| 129 | 15 | 20 |
| 130 | 16 | 21 |
| 131 | 17 | 22 |
| 132 | 18 | 23 |
| 133 | 19 | 24 |
| 134 | 20 | 25 |
| 135 | 21 | 26 |
| 136 | 22 | 27 |
| 137 | 23 | 28 |
| 138 | 24 | 29 |
| 139 | 25 | 30 |
| 140 | 0 | 6 |
| 141 | 1 | 7 |
| 142 | 2 | 8 |
| 143 | 3 | 9 |
| 144 | 4 | 10 |
| 145 | 5 | 11 |
| 146 | 6 | 12 |
| 147 | 7 | 13 |
| 148 | 8 | 14 |
| 149 | 9 | 15 |
| 150 | 10 | 16 |
| 151 | 11 | 17 |
| 152 | 12 | 18 |
| 153 | 13 | 19 |
| 154 | 14 | 20 |
| 155 | 15 | 21 |
| 156 | 16 | 22 |
| 157 | 17 | 23 |
| 158 | 18 | 24 |
| 159 | 19 | 25 |
| 160 | 20 | 26 |
| 161 | 21 | 27 |
| 162 | 22 | 28 |
| 163 | 23 | 29 |
| 164 | 24 | 30 |
| 165 | 0 | 7 |
| 166 | 1 | 8 |
| 167 | 2 | 9 |
| — | — | — |
| — | — | — |

A UE, which has demodulated a DL signal by performing a cell search procedure using an SSS and determined time and frequency parameters necessary for transmitting a UL signal at an accurate time, can communicate with an eNB only after acquiring system information necessary for system configuration of the UE from the eNB.

The system information is configured by a master information block (MIB) and system information blocks (SIBs). Each SIB includes a set of functionally associated parameters and is categorized into an MIB, SIB Type 1 (SIB1), SIB Type 2 (SIB2), and SIB3 to SIB8 according to included parameters. The MIB includes most frequency transmitted parameters which are essential for initial access of the UE to a network of the eNB. SIB1 includes parameters needed to determine if a specific cell is suitable for cell selection, as well as information about time-domain scheduling of the other SIBs The UE may receive the MIB through a broadcast channel (e.g. a PBCH). The MIB includes DL bandwidth (BW), PHICH configuration, and a system frame number SFN. Accordingly, the UE can be explicitly aware of information about the DL BW, SFN, and PHICH configuration by receiving the PBCH. Meanwhile, information which can be implicitly recognized by the UE through reception of the PBCH is the number of transmit antenna ports of the eNB. Information about the number of transmit antennas of the eNB is implicitly signaled by masking (e.g. XOR operation) a sequence corresponding to the number of transmit antennas to a 16-bit cyclic redundancy check (CRC) used for error detection of the PBCH.

The PBCH is mapped to four subframes during 40 ms. The time of 40 ms is blind-detected and explicit signaling about 40 ms is not separately present. In the time domain, the PBCH is transmitted on OFDM symbols 0 to 3 of slot 1 in subframe 0 (the second slot of subframe 0) of a radio frame.

In the frequency domain, a PSS/SSS and a PBCH are transmitted only in a total of 6 RBs, i.e. a total of 72 subcarriers, irrespective of actual system BW, wherein 3 RBs are in the left and the other 3 RBs are in the right centering on a DC subcarrier on corresponding OFDM symbols. Therefore, the UE is configured to detect or decode the SS and the PBCH irrespective of DL BW configured for the UE.

After initial cell search, a UE which has accessed a network of an eNB may acquire more detailed system information by receiving a PDCCH and a PDSCH according to information carried on the PDCCH. The UE which has performed the above-described procedure may perform reception of a PDCCH/PDSCH and transmission of a PUSCH/PUCCH as a normal UL/DL signal transmission procedure.

Figure 5:
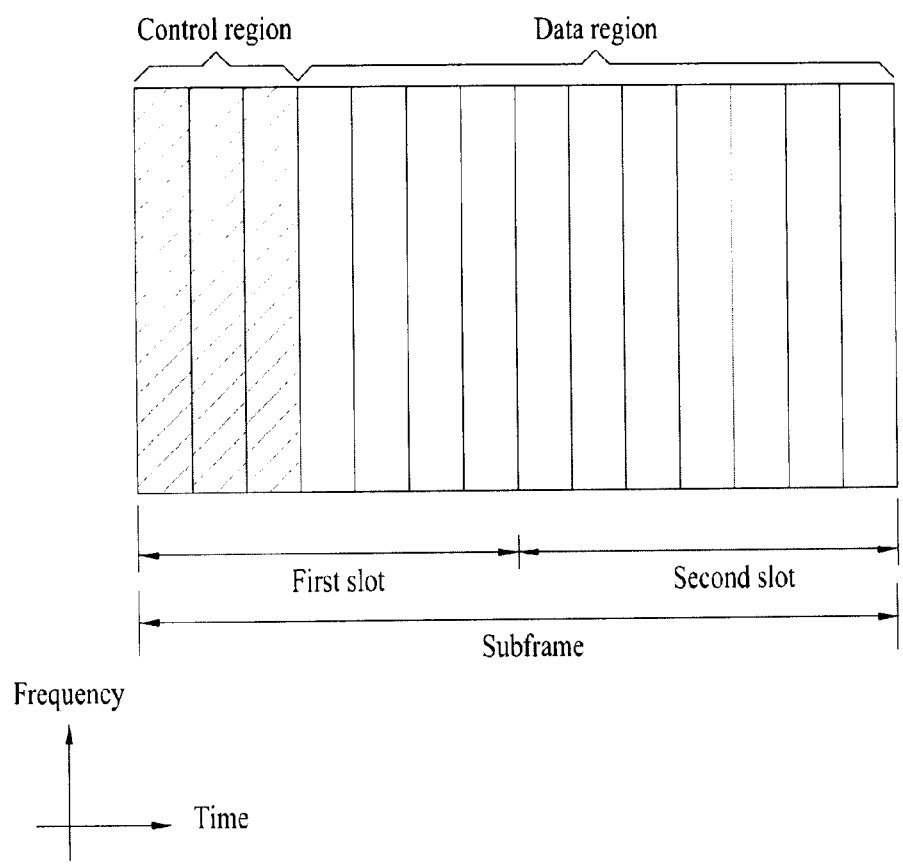
FIG. 5 illustrates the structure of a DL subframe used in a wireless communication system.

FIG. 5 illustrates the structure of a DL subframe used in a wireless communication system.

A DL subframe is divided into a control region and a data region in the time domain. Referring to FIG. 5, a maximum of 3 (or 4) OFDM symbols located in a front part of a first slot of a subframe corresponds to the control region. Hereinafter, a resource region for PDCCH transmission in a DL subframe is referred to as a PDCCH region. OFDM symbols other than the OFDM symbol(s) used in the control region correspond to the data region to which a physical downlink shared channel (PDSCH) is allocated. Hereinafter, a resource region available for PDSCH transmission in the DL subframe is referred to as a PDSCH region. Examples of a DL control channel used in 3GPP LTE include a physical control format indicator channel (PCFICH), a physical downlink control channel (PDCCH), a physical hybrid ARQ indicator channel (PHICH), etc. The PCFICH is transmitted in the first OFDM symbol of a subframe and carries information about the number of OFDM symbols available for transmission of a control channel within a subframe. The PHICH carries a HARQ (Hybrid Automatic Repeat Request) ACK/NACK (acknowledgment/negative-acknowledgment) signal as a response to UL transmission.

The control information transmitted through the PDCCH will be referred to as downlink control information (DCI). The DCI includes resource allocation information for a UE or UE group and other control information. For example, the DCI includes transport format and resource allocation information of a downlink shared channel (DL-SCH), transport format and resource allocation information of an uplink shared channel (UL-SCH), paging information on a paging channel (PCH), system information on the DL-SCH, resource allocation information of upper layer control message such as a random access response transmitted on the PDSCH, a set of transmission (Tx) power control commands of individual UEs within a UE group, Tx power control information, and activity information of voice over Internet protocol (VoIP). The size and usage of the DCI carried by one PDCCH are varied depending on DCI formats. The size of the DCI may be varied depending on a coding rate.

A plurality of PDCCHs may be transmitted within a control region. A UE may monitor the plurality of PDCCHs. An eNB determines a DCI format depending on the DCI to be transmitted to the UE, and attaches cyclic redundancy check (CRC) to the DCI. The CRC is masked (or scrambled) with an identifier (for example, radio network temporary identifier (RNTI)) depending on usage of the PDCCH or owner of the PDCCH. For example, if the PDCCH is for a specific UE, the CRC may be masked with an identifier (for example, cell-RNTI (C-RNTI)) of the corresponding UE. If the PDCCH is for a paging message, the CRC may be masked with a paging identifier (for example, Paging-RNTI (P-RNTI)). If the PDCCH is for system information (in more detail, system information block (SIB)), the CRC may be masked with system information RNTI (SI-RNTI). If the PDCCH is for a random access response, the CRC may be masked with a random access RNTI (RA-RNTI). For example, CRC masking (or scrambling) includes XOR operation of CRC and RNTI at a bit level.

The PDCCH is transmitted on an aggregation of one or a plurality of continuous control channel elements (CCEs). The CCE is a logic allocation unit used to provide a coding rate based on the status of a radio channel to the PDCCH. The CCE corresponds to a plurality of resource element groups (REGs). For example, one CCE corresponds to nine resource element groups (REGs), and one REG corresponds to four REs. Four QPSK symbols are mapped into each REG. A resource element (RE) occupied by the reference signal (RS) is not included in the REG. Accordingly, the number of REGs within given OFDM symbols is varied depending on the presence of the RS. The REGs are also used for other downlink control channels (that is, PDFICH and PHICH). The number of DCI formats and DCI bits is determined in accordance with the number of CCEs. CCEs are numbered and used consecutively. In order to simplify a decoding process, the PDCCH having a format that includes n CCEs may only start on a CCE having a CCE number corresponding to a multiple of n. The number of CCEs used for transmission of a specific PDCCH is determined by the eNB in accordance with channel status. For example, one CCE may be required for a PDCCH for a UE (for example, adjacent to eNB) having a good downlink channel. However, in case of a PDCCH for a UE (for example, located near the cell edge) having a poor channel, eight CCEs may be required to obtain sufficient robustness. Additionally, a power level of the PDCCH may be adjusted to correspond to a channel status.

In a 3GPP LTE/LTE-A system, a CCE set in which a PDCCH can be located for each UE is defined. A CCE set in which the UE can detect a PDCCH thereof is referred to as a PDCCH search space or simply as a search space (SS). An individual resource on which the PDCCH can be transmitted in the SS is called a PDCCH candidate. A set of PDCCH candidates that the UE is to monitor is defined as the SS. SSs may have different sizes and a dedicated SS and a common SS are defined. The dedicated SS is a UE-specific SS and is configured for each individual UE. The common SS is configured for a plurality of UEs. All UEs receive information about the common SS. An eNB transmits an actual PDCCH (DCI) on a PDCCH candidate in a search space and a UE monitors the search space to detect the PDCCH (DCI). Here, monitoring implies attempting to decode each PDCCH in the corresponding SS according to all monitored DCI formats. The UE may detect a PDCCH thereof by monitoring a plurality of PDCCHs. Basically, the UE does not know the location at which a PDCCH thereof is transmitted. Therefore, the UE attempts to decode all PDCCHs of the corresponding DCI format for each subframe until a PDCCH having an ID thereof is detected and this process is referred to as blind detection (or blind decoding (BD)).

For example, it is assumed that a specific PDCCH is CRC-masked with a radio network temporary identity (RNTI) 'A' and information about data transmitted using a radio resource 'B' (e.g. frequency location) and using transport format information 'C' (e.g. transmission block size, modulation scheme, coding information, etc.) is transmitted in a specific DL subframe. Then, the UE monitors the PDCCH using RNTI information thereof. The UE having the RNTI 'A' receives the PDCCH and receives the PDSCH indicated by 'B' and 'C' through information of the received PDCCH.

Figure 6:
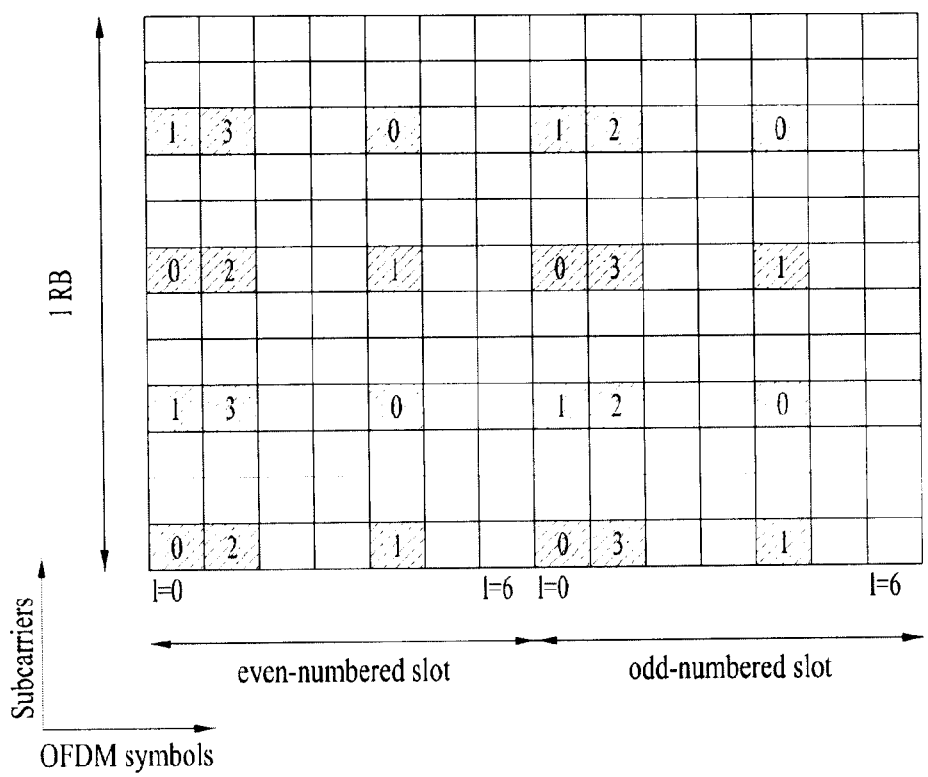
FIG. 6 illustrates cell specific reference signals (CRSs).

FIG. 6 illustrates CRSs. Current 3GPP LTE/LTE-A standards demand that a CRS among various RSs defined in an associated system be transmitted in all DL subframes in a cell supporting PDSCH transmission.

Referring to FIG. 6, in an LTE/LTE-A system, CRSs are transmitted in the entire DL BW of a carrier in every DL subframe on one or plural antenna ports according to the number of antenna ports. CRSs are RSs for measurement which can be used for measurement of a DL channel state and simultaneously the CRSs are RSs for demodulation which can be used for data demodulation. The CRSs are used not only for channel state measurement and data demodulation but also for tracking such as maintenance of time synchronization and correction of a frequency offset after a UE acquires time synchronization and frequency synchronization of a carrier used for communication with an eNB.

Figure 7:
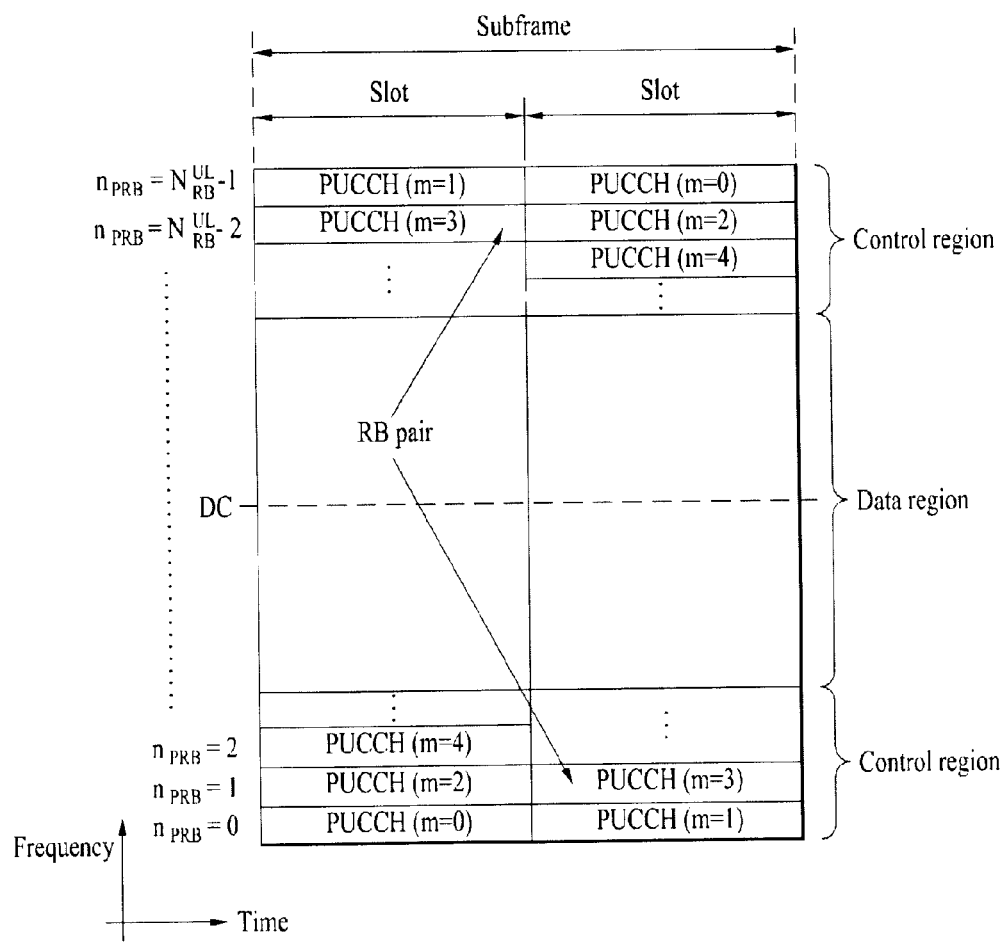
FIG. 7 illustrates the structure of a UL subframe used in a wireless communication system.

FIG. 7 illustrates the structure of a UL subframe used in a wireless communication system.

Referring to FIG. 7, a UL subframe may be divided into a data region and a control region in the frequency domain. One or several PUCCHs may be allocated to the control region to deliver UCI. One or several PUSCHs may be allocated to the data region of the UE subframe to carry user data.

In the UL subframe, subcarriers distant from a direct current (DC) subcarrier are used as the control region. In other words, subcarriers located at both ends of a UL transmission BW are allocated to transmit UCI. A DC subcarrier is a component unused for signal transmission and is mapped to a carrier frequency $f_0$ in a frequency up-conversion process. A PUCCH for one UE is allocated to an RB pair belonging to resources operating on one carrier frequency and RBs belonging to the RB pair occupy different subcarriers in two slots. The PUCCH allocated in this way is expressed by frequency hopping of the RB pair allocated to the PUCCH over a slot boundary. If frequency hopping is not applied, the RB pair occupies the same subcarriers.

The PUCCH may be used to transmit the following control information.

- Scheduling request (SR): SR is information used to request a UL-SCH resource and is transmitted using an on-off keying (OOK) scheme.
- HARQ-ACK: HARQ-ACK is a response to a PDCCH and/or a response to a DL data packet (e.g. a codeword) on a PDSCH. HARQ-ACK indicates whether the PDCCH or PDSCH has been successfully received. 1-bit HARQ-ACK is transmitted in response to a single DL codeword and 2-bit HARQ-ACK is transmitted in response to two DL codewords. A HARQ-ACK response includes a positive ACK (simply, ACK), negative ACK (NACK), discontinuous transmission (DTX), or NACK/DRX. HARQ-ACK is used interchangeably with HARQ ACK/NACK and ACK/NACK.
- Channel state information (CSI): CSI is feedback information for a DL channel. MIMO-related feedback information includes a rank indicator (RI) and a precoding matrix indicator (PMI).

Figure 8:
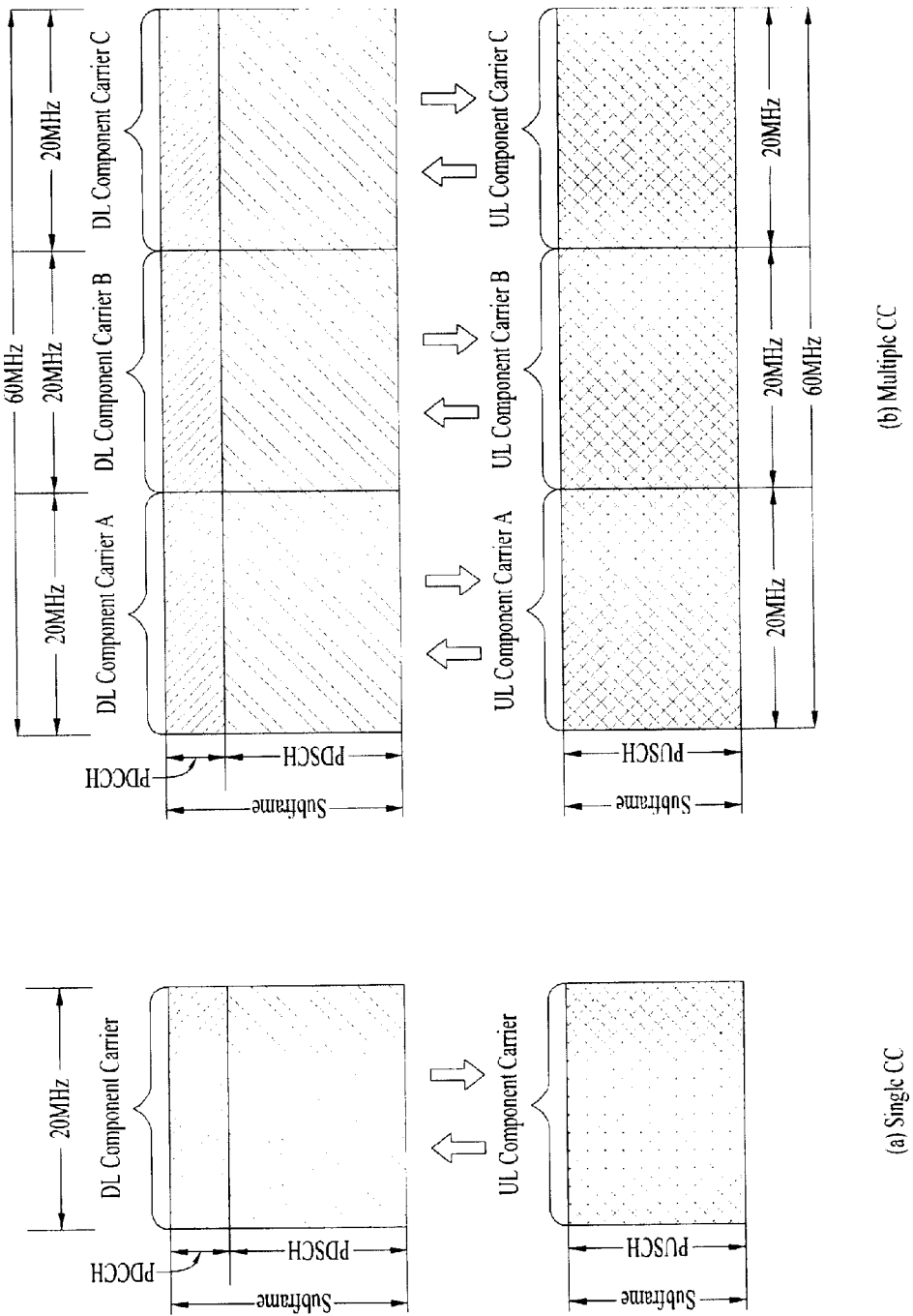
FIG. 8 is a diagram for explaining single-carrier communication and multi-carrier communication.

FIG. 8 is a diagram for explaining single-carrier communication and multi-carrier communication. Specially, FIG. 8(a) illustrates a subframe structure of a single carrier and FIG. 8(b) illustrates a subframe structure of multiple carriers.

Referring to FIG. 8(a), a general wireless communication system transmits/receives data through one downlink (DL) band and through one uplink (UL) band corresponding to the DL band (in the case of frequency division duplex (FDD) mode), or divides a prescribed radio frame into a UL time unit and a DL time unit in the time domain and transmits/receives data through the UL/DL time unit (in the case of time division duplex (TDD) mode). Recently, to use a wider frequency band in recent wireless communication systems, introduction of carrier aggregation (or BW aggregation) technology that uses a wider UL/DL BW by aggregating a plurality of UL/DL frequency blocks has been discussed. A carrier aggregation (CA) is different from an orthogonal frequency division multiplexing (OFDM) system in that DL or UL communication is performed using a plurality of carrier frequencies, whereas the OFDM system carries a base frequency band divided into a plurality of orthogonal subcarriers on a single carrier frequency to perform DL or UL communication. Hereinbelow, each of carriers aggregated by carrier aggregation will be referred to as a component carrier (CC). Referring to FIG. 8(b), three 20 MHz CCs in each of UL and DL are aggregated to support a BW of 60 MHz. The CCs may be contiguous or non-contiguous in the frequency domain. Although FIG. 8(b) illustrates that a BW of UL CC and a BW of DL CC are the same as each other and are symmetrical, a BW of each component carrier may be defined independently. In addition, asymmetric carrier aggregation where the number of UL CCs is different from the number of DL CCs may be configured. A DL/UL CC for a specific UE may be referred to as a serving UL/DL CC configured at the specific UE.

The eNB may activate all or some of the serving CCs configured in the UE or deactivate some of the serving CCs for communication with the UE. The eNB may change the activated/deactivated CC, and may change the number of CCs which is/are activated or deactivated. If the eNB allocates available CCs to the UE cell-specifically or UE-specifically, at least one of the allocated CCs is not deactivated unless CC allocation to the UE is fully reconfigured or unless the UE performs handover. Such CC which is not deactivated unless CC allocation to the UE is full reconfigured will be referred to as a primary CC (PCC), and CC which may be activated/deactivated freely by the eNB will be referred to as secondary CC (SCC). The PCC and the SCC may be identified from each other on the basis of the control information. For example, specific control information may be set to be transmitted and received through a specific CC only. This specific CC may be referred to as the PCC, and the other CC(s) may be referred to as SCC(s).

In the meantime, the 3GPP LTE(-A) system uses a concept of cell to manage radio resources. The cell is defined by combination of downlink resources and uplink resources, that is, combination of DL CC and UL CC. The cell may be configured by downlink resources only, or may be configured by downlink resources and uplink resources. If carrier aggregation is supported, linkage between a carrier frequency of the downlink resources (or DL CC) and a carrier frequency of the uplink resources (or UL CC) may be indicated by system information. For example, combination of the DL resources and the UL resources may be indicated by linkage of system information block type 2 (SIB2). In this case, the carrier frequency means a center frequency of each cell or CC. A cell operating on a primary frequency may be referred to as a primary cell (PCell) or PCC, and a cell operating on a secondary frequency may be referred to as a secondary cell (SCell) or SCC. The carrier corresponding to the PCell on downlink will be referred to as a downlink primary CC (DL PCC), and the carrier corresponding to the PCell on uplink will be referred to as an uplink primary CC (UL PCC). A SCell means a cell that may be configured after completion of radio resource control (RRC) connection establishment and used to provide additional radio resources. The SCell may form a set of serving cells for the UE together with the PCell in accordance with capabilities of the UE. The carrier corresponding to the SCell on the downlink will be referred to as downlink secondary CC (DL SCC), and the carrier corresponding to the SCell on the uplink will be referred to as uplink secondary CC (UL SCC). Although the UE is in RRC-CONNECTED state, if it is not configured by carrier aggregation or does not support carrier aggregation, a single serving cell configured by the PCell only exists.

The term "cell" used for carrier aggregation is distinguishable from the term "cell" indicating a certain local area where a communication service is provided by one eNB or one antenna group. In order to differentiate the "cell" indicating a certain local area from the "cell" used for carrier aggregation, in the present invention, the "cell" for carrier aggregation will be referred to as CC, whereas the "cell" for the local area will be simply referred to as cell.

In the case of an SS according to a legacy LTE/LTE-A system, when a UE attempts to perform initial access to a CC, the UE obtains time synchronization, frequency synchronization, a subframe boundary, a radio frame boundary, and a cell ID and tracks a center frequency, through the SS. In the case of the CC on which initial access should be performed, the SS is transmitted with a period and pattern prescheduled between an eNB and a UE. Since the UE is unable to know frequency BW of the CC on which initial access is performed, the SS is transmitted with the most fundamental minimum frequency BW.

Meanwhile, when a plurality of CCs is aggregated in the legacy LTE-A system, it is assumed that time synchronization of a UL/DL frame of an SCC is equal to that of a PCC under the condition that CCs which are not considerably separated in the frequency domain are aggregated. However, in the future, the probability is that a plurality of different CCs, which belongs to different bands or are separated by a significant distant on frequency, that is, which have different propagation characteristics, may be aggregated for the UE. In this case, the conventional assumption that time synchronization of the PCC is identical to time synchronization of the SCC may seriously affect synchronization of DL/UL signals of the SCC.

Meanwhile, in the case of an LCT CC, radio resources usable for transmission/reception of physical UL/DL channels and radio resources usable for transmission/reception of physical UL/DL signals, among radio resource operating on the LCT CC, are predetermined as described with reference to FIG. 1 to FIG. 7. In other words, the LCT CC should be configured to carry physical channels/signals not through an arbitrary time frequency in an arbitrary time resource but through a specific time frequency in a specific time resource according to type of a physical channel or physical signal. For example, physical DL control channels may be configured only on front OFDM symbol(s) among OFDM symbols of a DL subframe and a PDSCH cannot be configured on the front OFDM symbol(s) to which the physical DL control channels may be mapped. As another example, CRS(s) corresponding to antenna port(s) of an eNB is transmitted on REs illustrated in FIG. 6 in every subframe over the entire BW irrespective of DL BW of the eNB. Therefore, if the number of antenna ports of the eNB is 1, REs indicated by '0' in FIG. 6 cannot be used for transmission of other DL signals and, if the number of antenna ports of the eNB is 4, REs denoted by '0', '1', '2', and '3' in FIG. 6 cannot be used for transmission of other DL signals. In addition, there are various constraints about configuration of an LCT CC and these constraints have increased with advance of a communication system. Among such constraints, there are unnecessary constraints according to development of communication technology because of a communication technology level when the constraints were made. Moreover, for the same purpose, both constraints of conventional technology and constraints of new technology may be present. Due to considerable increase of the constraints, constraints introduced for development of a communication system serve as factors which cannot efficiently use radio resources of an associated CC. Accordingly, introduction of an NCT CC which is free from unnecessary constraints according to development of communication technology and is more simplified than conventional constraints has been discussed.

In the present invention, the NCT CC may not satisfy at least one of constraints indicating that a CRS should be configured on an associated CC in every DL subframe, constraints indicating that a CRS should be configured on an associated CC with respect to each antenna port of an eNB, and constraints indicating that front OFDM symbols of a prescribed number of a DL subframe should be reserved for transmission of a control channel such as a PDCCH over the entire frequency band. For example, on the NCT CC, a CRS may be configured not in every subframe but in subframes of a predetermined number (>1). Alternatively, only a CRS for one antenna port (e.g. antenna port 0) may be configured on the NCT CC irrespective of the number of antenna ports of an eNB. Alternatively, a tracking RS is newly defined for tracking of time synchronization and/or frequency synchronization instead of a legacy CRS for channel state measurement and demodulation and the tracking RS may be configured in partial subframes and/or partial frequency resources on the NCT CC. Alternatively, a PDSCH may be configured on front OFDM symbols on the NCT CC, a PDCCH may be configured in a legacy PDSCH region rather than the front OFDM symbols, or the PDCCH may be configured using partial frequency resources.

Since the NCT CC is not configured according to constraints of a legacy system, the NCT CC cannot be recognized by a UE according to a legacy system. Hereinafter, a UE which is configured according to a legacy system and cannot support an NCT CC will be referred to as a legacy UE and a UE which is configured to support the NCT CC will be referred to as an NCT UE.

In carrier aggregation, the NCT CC may be used as an SCC. Further, the NCT CC may also be used as a PCC. Since the NCT CC does not consider use by a legacy UE, the legacy UE does not need to perform cell search, cell selection, cell reselection, etc. on the NCT CC.

If the NCT CC is not used as the PCC and is used only as the SCC, CCs can be more efficiently used because unnecessary constraints for the SCC can be reduced as compared with a legacy LCT CC which may be used as the PCC. However, since time/frequency synchronization of the NCT CC may not be identical to synchronization of the PCC, a UE needs to perform time synchronization and frequency synchronization of the NCT CC. Accordingly, the NCT CC for DL needs to be configured such that the UE performs time synchronization and frequency synchronization and, at the same time, a legacy UE is prevented from detecting a PSS/SSS. Therefore, the present invention proposes that the UE perform synchronization of a DL signal on an NCT CC and, at the same time, the legacy UE is prevented from detecting the NCT CC through synchronization.

Further, if a CRS is used only for tracking or a tracking RS is defined, since the CRS cannot used for demodulation, only DMRS based data demodulation out of CRS based data demodulation and UE-specific RS based data demodulation, i.e. DMRS based data demodulation, may be supported. In this case, when location of an OFDM symbol to which a PSS/SSS is mapped and location of a symbol to which a DMRS is mapped collide, it may be difficult to puncture a DMRS RE and perform CRS based data demodulation. Accordingly, if the NCT CC is configured such that the CRS cannot be for demodulation because the CRS is used only for tracking or because the tracking RS is defined, it is necessary to change location of the PSS/SSS. Hereinafter, a CRS used only for tracking or a new RS is collectively referred to as a tracking RS.

If the NCT CC is used as an SCC, since a UE may acquire information such as a cell ID, CP length, and system information, through a PCC, an SS of the NCT CC does not need to be used to acquire the cell ID and detecting CP length. Accordingly, it is not always necessary to transmission both a PSS and an SSS as opposed to a legacy system. In order for a UE to perform time synchronization and/or frequency synchronization of a DL signal on the NCT CC, an SS may be used. Thus used SS may be the same as a signal used for legacy PSS/SSS or may be a new SS.

1. Synchronization of NCT CC Using PSS

Synchronization of an NCT CC may be performed using only a PSS out of the PSS and an SSS.

Figure 9:
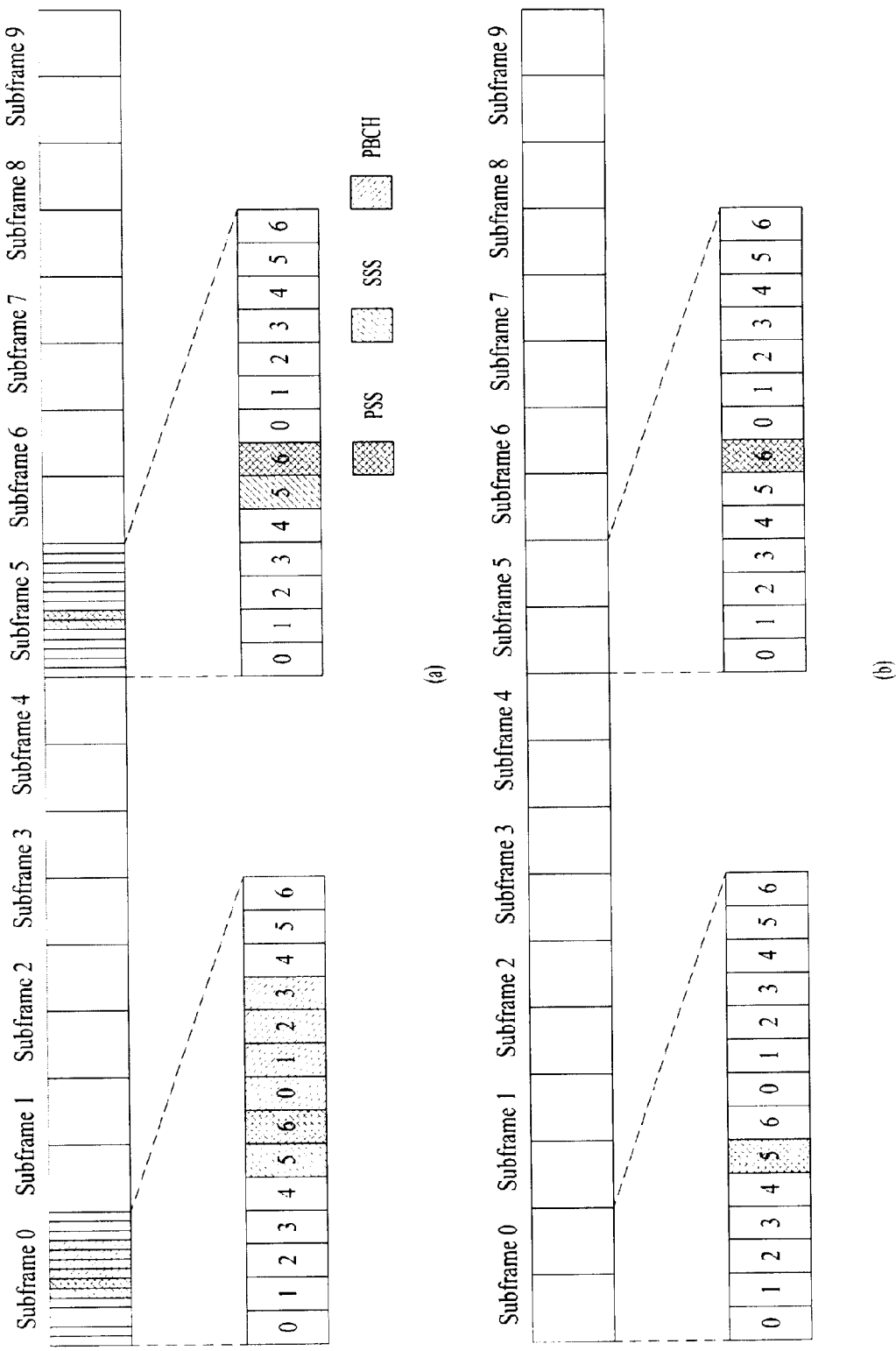
FIG. 9 is a diagram for explaining an embodiment of the present invention to perform synchronization on a new carrier type (NCT) component carrier (CC).

FIG. 9 is a diagram for explaining an embodiment of the present invention to perform synchronization on an NCT CC. FIG. 9(a) illustrates OFDM symbols including a PSS/SSS and a PBCH in a radio frame configured as a normal CP shown in FIG. 3(a) and FIG. 9(b) illustrates an example of performing synchronization using only a PSS out of the PSS and an SSS.

When only a PSS is used for synchronization on an NCT CC, a legacy UE cannot detect the NCT CC because the legacy UE cannot detect an SSS in spite of detection of the PSS.

Only when the PSS is used, an NCT UE can adjust synchronization of a subframe using the PSS but cannot adjust frame synchronization of 10 ms. Since each of a time duration of the PSS transmitted in subframe 0 and a time duration of the PSS transmitted in subframe 5 has a period of 5 ms, the UE can recognize a boundary of 5 ms but cannot recognize a boundary of 10 ms, through the PSS. To solve this problem, two PSSs are defined to be transmitted in a time duration other than 5 ms. For example, referring to FIG. 9(b), two PSSs are located in subframe 0 and subframe 5, respectively, but an OFDM symbol having a PSS in each subframe is different from a legacy OFDM symbol (refer to FIG. 9(a)) so that the UE can detect a frame boundary of 10 ms. As another example, if one PSS is transmitted in subframe n, the other PSS is configured to be transmitted in a subframe other than subframe n+5 so that the UE can detect a frame boundary of 10 ms. That is, the PSS may be transmitted at a period other than 5 ms or a transmission duration of successive PSSs may be configured to be different from a legacy duration.

As another method for causing the UE to detect a frame boundary of 10 ms, only one PSS may be transmitted during a duration corresponding to a multiple of 10 ms. Alternatively, the UE may detect a frame boundary of 10 ms by locating three or more PSSs during a radio frame of 10 ms so that PSSs are transmitted at an unequal interval. This can be extended such that k PSSs are located at an unequal interval during a duration of n*10 ms and thus the UE can detect a frame boundary of 10 ms.

Meanwhile, a current PSS includes three types of sequences distinguished by a root index. To perform synchronization using only PSSs on an NCT CC, three types of different PSSs may be used. For example, if three PSSs are PSS0, PSS1, and PSS2, then PSS0 may be used as the first PSS and PSS1 may be used as the second PSS. Alternatively, PSS0, PSS1, and PSS2 may be alternately used as the PSSs. As another method, one sequence may be cyclically shifted for transmission in different frequency or time domains at every PSS transmission time. For example, if PSS0 is transmitted as the first PSS, a sequence obtained by cyclic-shifting PSS0 by k in the time domain may be transmitted as the second PSS.

A PSS on an LCT CC is configured in center 6 RBs in the frequency domain and a legacy UE is implemented to attempt to detect an SS in the 6 RBs near to a center frequency. In order to prevent a legacy UE from detecting the PSS on an NCT CC when synchronization of the NCT CC is performed using only the PSS, the PSS on the NCT CC may be located at a position deviating from the center frequency by a predetermined magnitude. Since the legacy UE tries to detect the PSS using only 6 RBs near the center frequency, the legacy UE cannot detect the PSS of the NCT CC. In a 3GPP LTE/LTE-A system, the legacy UE searches for the center frequency in units of 300 kHz. Therefore, in order for the legacy UE to incorrectly recognize the NCT CC as the LCT CC by detecting the PSS, a frequency magnitude deviating from the center frequency is desirably not a multiple of 300 kHz.

2. Synchronization of NCT CC Using SSS

Synchronization of an NCT CC may be performed using only an SSS out of a PSS and the SSS. In order to prevent a legacy UE from detecting the PSS on the NCT CC, the PSS may not be configured on the NCT CC or the PSS may be configured in a location different from a legacy location. For example, on an LCT CC, the first PSS is located in subframe n, and the second PSS is located in subframe n+5. But, on the LCT CC, the first PSS may not be located in subframe n, thereby causing the legacy UE not to correctly detect the PSS and not to further detect the SSS. Particularly, if the PSS is not configured on the NCT CC, the legacy UE can be prevented from recognizing a CC by detecting the PSS. Since the legacy UE detects the SSS using the PSS, the legacy UE cannot detect the SSS without detecting the PSS and further cannot recognize presence of the NCT CC. Therefore, the legacy UE cannot detect the NCT CC.

If the legacy UE cannot detect the PSS, since 168 cell IDs to which a cell ID of an associated CC belongs among 3*168 cell IDs cannot be limited, the UE cannot detect the cell ID of the associated cell in principle. However, if the NCT CC is used only as the SCC, an NCT UE detects the cell ID using a PSS on a PCC and an SSS or receives the cell ID through other serving CCs carrier-aggregated before the NCT CC, thereby detecting an SSS of the NCT CC without significant overhead. In addition, if an SSS sequence of the NCT CC is determined using a PSS as on the LCT CC, the NCT UE may detect the SSS using a PSS of a PCC or a PSS of an arbitrary LCT CC among serving CCs. Furthermore, if the same physical layer cell IDs used for the LCT CC are used for the NCT CC and physical layer cell IDs of CCs in the same cell are the same, since the NCT UE is aware of the physical layer cell IDs obtained from a PCC or received through an arbitrary serving CC and of a PSS of the PCC or the arbitrary serving CC, the NCT UE also knows a sequence of an SSS to be transmitted on the NCT CC. Accordingly, the NCT UE may perform synchronization of the NCT CC by easily detecting the SSS on the NCT CC. That is, since the NCT UE is implemented to be able to detect only the SSS without detecting the PSS on the NCT CC, synchronization may be performed by detecting the SSS on the NCT CC.

Like legacy sequences, different sequences may be used as two SSSs transmitted in one frame. If an SSS of subframe 0 and an SSS of subframe 5 are different sequences like the legacy sequences, the NCT UE may perform synchronization and, at the same time, detect a frame boundary of 10 ms. The two SSSs in one frame of 10 ms may have different durations other than 5 ms. For example, although the two SSSs may be located in subframe 0 and subframe 5, respectively, as in a legacy scheme, the SSSs may be located on OFDM symbols other than legacy OFDM symbols. As another example, when one SSS is located in subframe n, the other SSS may not be located in subframe n+5, so that the UE may detect the frame boundary of 10 ms.

The same sequence may be used as two SSSs located in one frame of the NCT CC. Since the UE cannot detect the frame boundary of 10 ms using the SSSs when the same sequence is transmitted every 5 ms as in the legacy scheme, the two SSSs may have a duration other than 5 ms. For example, the two SSSs are located in subframe 0 and subframe 5 but OFDM symbols having the SSSs in the respective subframes may be different from legacy OFDM symbols, so that the UE can detect the frame boundary of 10 ms. As another example, PSSs may be configured such that when one PSS is transmitted in subframe n, the other PSS is transmitted in a subframe other than subframe n+5. As a result, a UE can detect the frame boundary of 10 ms. That is, the SSSs may be transmitted at an interval other than 5 ms or a duration of successive PSSs may be changed.

Only one SSS may be used during a time duration corresponding to a multiple of 10 ms on the NCT CC. Then, the UE may detect the frame boundary of 10 ms. One SSS may have one type of two legacy SSSs. The two legacy SSSs may be alternately used or may be used as one SSS with a constant pattern. A new type of sequence different from a legacy sequence may be used as the one SSS transmitted on the NCT CC.

On the NCT CC, the NCT UE may detect a frame boundary of 10 ms by locating three or more SSSs at an unequal interval during a radio frame of 10 ms. This can be extended such that k SSSs are located at an unequal interval during a duration of n*10 ms and thus the UE can detect the frame boundary of 10 ms. In this case, the used SSS may have one type of two legacy SSSs. Two SSSs may used alternately or may be used with a constant pattern as one SS. A new type of sequence different from a legacy sequence may be used as the one SSS transmitted on the NCT CC.

Currently, 168 distinguishable sequences may be used as an SSS and the sequences are distinguished by two indexes m0 and m1. To perform synchronization using only the SSS on the NCT CC, 168 different SSSs may be used. For example, m0 and m1 used for the first SSS may be different from m0 and m1 used for the second SSS. Alternatively, multiple SSS sequences may be alternately used for the SSS. As another example, one sequence may be cyclically shifted in the time domain or the frequency domain at every SSS transmission time. For example, if a sequence having indexes of m0 and m1 are used for the first SSS, a sequence obtained by cyclically shifting the sequence used for the first SSS by k in the time domain or frequency domain may be used for the second SSS.

3. Synchronization of NCT CC Using PSS and SSS

Synchronization of an NCT CC may be performed using both a PSS and an SSS. If the PSS and SSS are used for synchronization of the NCT CC, the NCT CC may be used not only as an SCC but also as a PCC. In other words, the NCT CC may be used as a stand-alone CC other than an SCC for other CCs.

Figure 10:
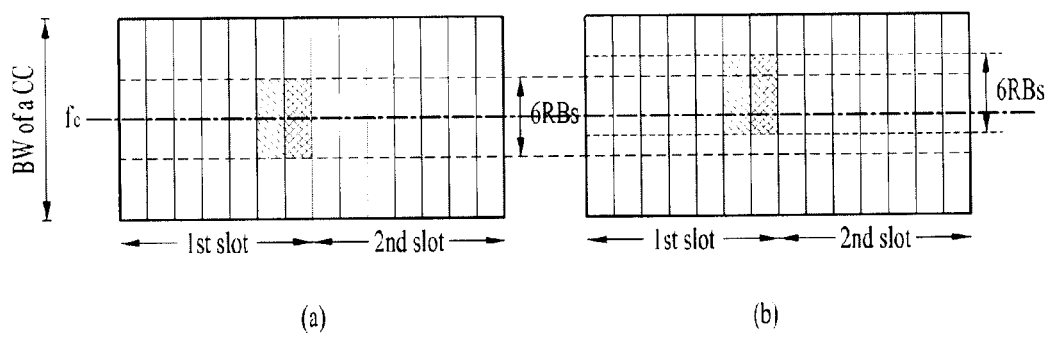
FIGS. 10 and 11 are diagrams for explaining another embodiment of the present invention to perform synchronization on an NCT CC.
Figure 11:
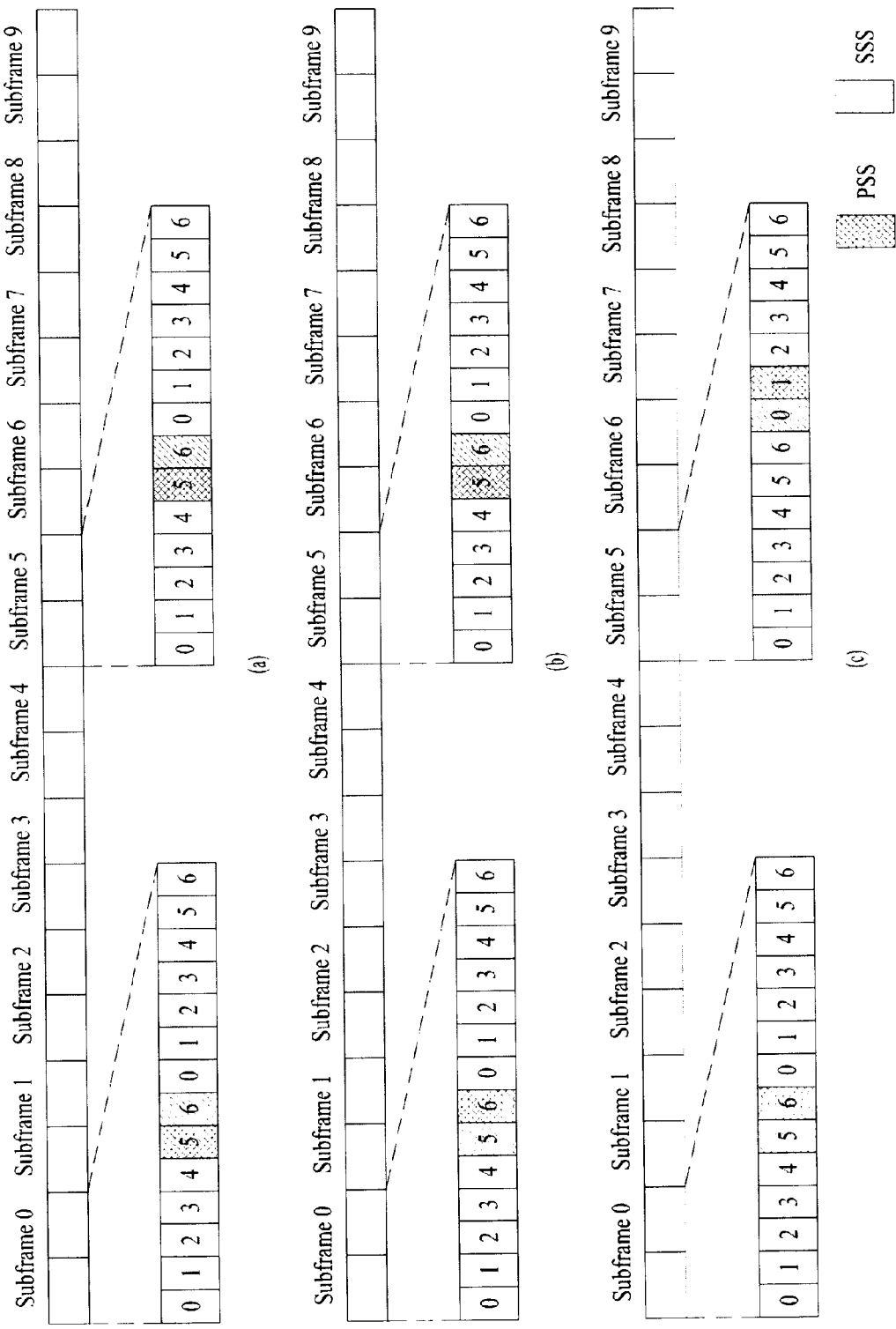

FIGS. 10 and 11 are diagrams for explaining another embodiment of the present invention to perform synchronization on an NCT CC.

Referring to FIG. 10(a), a PSS and an SSS on an LCT CC are located in center 6 RBs in the frequency domain. In order to prevent a legacy UE from detecting an SS for synchronization of the NCT CC, a PSS and an SSS may be located at positions deviating from a center frequency by a predetermined size as illustrated in FIG. 10(b). Since the legacy UE which is configured to detect the PSS and SSS in 6 RBs centering upon a center frequency tries to detect SSs using only the 6 center RBs, the legacy UE cannot detect SSs configured to deviate from the center frequency.

Desirably, a frequency magnitude of an SS of the NCT CC deviating from the center frequency is not a multiple of 300 kHz. If the SS of the NCT CC is defined to deviate from the center frequency in units of RBs, it is desirable that a degree of the SS of the NCT CC deviating from the center frequency be not a multiple of 5 RBs (=900 kHz).

As another method for preventing the legacy UE from detecting the SSs, the SSs may be located in order of the PSS and an SSS as illustrated in FIG. 11(b) instead of a legacy order of the SSS and the PSS. Alternatively, the SSs may be located in order of the SSS and the PSS in subframe 0 as in a legacy order but may be arranged in order of the PSS and the SSS in subframe 5 as illustrated in FIG. 11(b), unlike the legacy order.

As another method for preventing the legacy UE from detecting the SSs of the NCT CC, the SSs may be allocated such that a location of an OFDM symbol having the first PSS/SSS in a subframe having the first PSS/SSS is different from a location of an OFDM symbol having the second PSS/SSS in a subframe having the second PSS/SSS as illustrated in FIG. 11(c). Alternatively, if one PSS/SSS is located in subframe n, another PSS/SSS may not be located in subframe n+5 so that the legacy UEs may not detect the SSs.

The PSS and the SSS may be located on contiguous OFDM symbols or may be separated from each other. For example, the SSS may be located on OFDM symbol 5 and the PSS may be located on OFDM symbol 7 to prevent the legacy UE from detecting the SSs. This can be extended such that locations of OFDM symbols having the PSS/SSS are changed (periodically) whenever the PSS/SSS is transmitted. For instance, an SSS and a PSS configured in subframe 0 are located on OFDM symbols 5 and 6 in subframe 0, respectively, but an SSS and a PSS configured in subframe 5 may be located on OFDM symbols 5 and 6 in subframe 5, respectively.

When locations of the PSS and SSS become different from legacy locations, locations of a CRS, a DRS and a CSI-RS may be considered in order to avoid collision with other physical signals in a subframe to which the PSS/SSS is mapped. For example, the following situation may be considered.

1) Subframe in which CRS, UE-Specific RS, CSI-RS are Present

Figure 12:
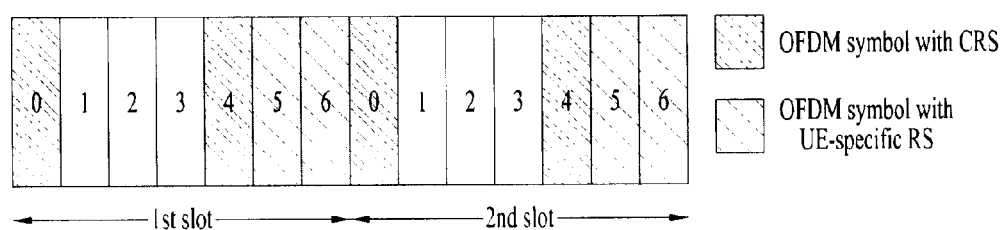
FIG. 12 illustrates an example of locations of a PSS and an SSS in a subframe of an NCT CC according to an embodiment of the present invention.
Figure 12:
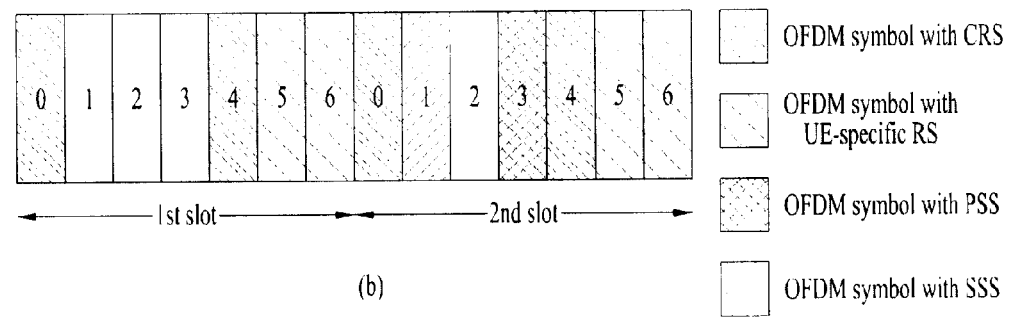

FIG. 12 illustrates an example of locations of a PSS and an SSS in a subframe of an NCT CC according to an embodiment of the present invention.

A CRS and a UE-specific RS may be present in one subframe as illustrated in FIG. 12(a). The CRS may be a tracking RS. A PSS and an SSS may be located on OFDM symbols other than OFDM symbols on which the CRS and UE-specific RS are located. In this case, if the SSs are located on two successive OFDM symbols in order of the SSS and PSS, since a legacy UE may recognize an NCT CC, the SSS and PSS are separated by one or more subframes or the SSs are allocated to be successively located in order of the PSS and SSS.

If the SSS is located on OFDM symbol n of a subframe and the PSS is located on OFDM symbol n+3 of the subframe, since the legacy UE has a risk of recognizing the subframe as a TDD frame, the SSs are desirably allocated such that the SSS is located on OFDM symbol n and the PSS is not located on OFDM symbol n+3. For example, referring to FIG. 12(b), the SSs may be allocated such that the SSS and PSS are located on OFDM symbols 1 and 3 of one of two slots in a subframe, respectively. Alternatively, the SSs may be allocated such that the PSS and SSS may be located on OFDM symbols 1 and 3 of one of two slots in a subframe, respectively.

Locations of OFDM symbols to which the PSS and SSS are mapped in a subframe having the PSS/SSS are listed below in consideration of a CRS and a UE-specific RS.

TABLE 5

|  | PSS | SSS |
| --- | --- | --- |
| OFDM symbol index | 1 of $1^{st}$ slot | 2 of $1^{st}$ slot |
|  | 1 of $1^{st}$ slot | 3 of $1^{st}$ slot |
|  | 2 of $1^{st}$ slot | 3 of $1^{st}$ slot |
|  | 2 of $1^{st}$ slot | 1 of $1^{st}$ slot |
|  | 3 of $1^{st}$ slot | 1 of $1^{st}$ slot |
|  | 3 of $1^{st}$ slot | 2 of $1^{st}$ slot |
|  | 1 of $2^{nd}$ slot | 2 of $2^{nd}$ slot |
|  | 1 of $2^{nd}$ slot | 3 of $2^{nd}$ slot |
|  | 2 of $2^{nd}$ slot | 3 of $2^{nd}$ slot |
|  | 2 of $2^{nd}$ slot | 1 of $2^{nd}$ slot |
|  | 3 of $2^{nd}$ slot | 1 of $2^{nd}$ slot |
|  | 3 of $2^{nd}$ slot | 2 of $2^{nd}$ slot |

If the PSS or SSS collides with the CSI-RS, i.e. if a time-frequency resource carrying the PSS or SSS and a time-frequency resource carrying the CSI-RS overlap, the CSI-RS may not be transmitted on a resource in which the PSS/SSS collides with the CSI-RS and only the SS may be transmitted on the resource.

2) Subframe in which UE-Specific RS and CSI-RS are Present

Figure 13:
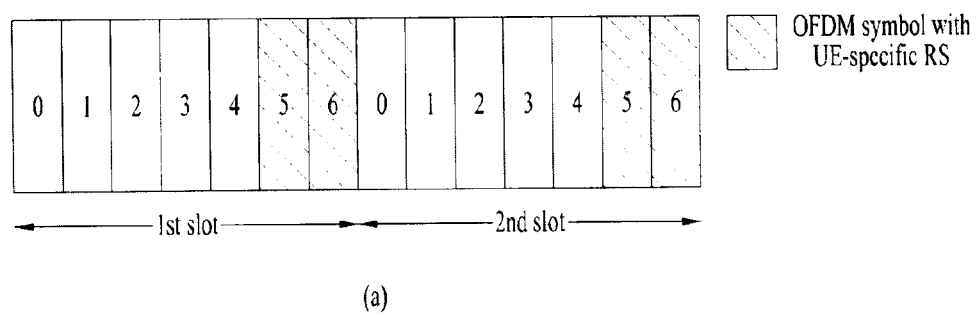
FIG. 13 illustrates another example of locations of a PSS and an SSS in a subframe of an NCT CC according to an embodiment of the present.
Figure 13:
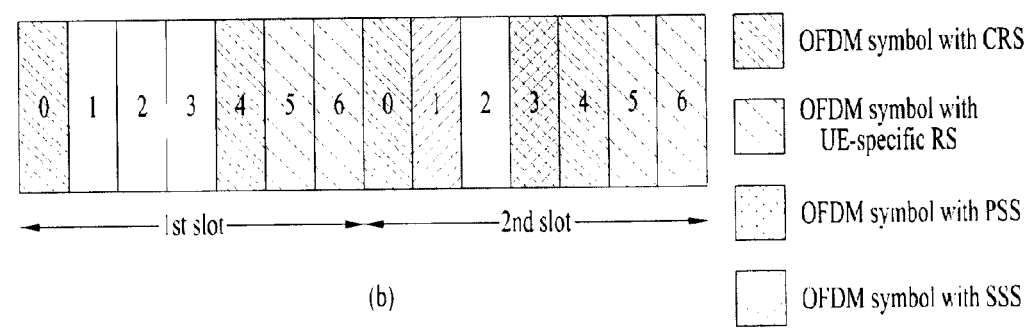

FIG. 13 illustrates another example of locations of a PSS and an SSS in a subframe of an NCT CC according to an embodiment of the present.

A UE-specific RS may be present in one subframe as illustrated in FIG. 13(a). A PSS and an SSS may be located on symbols other than an OFDM symbol on which the UE-specific RS is located. In this case, if the SSs are located on two successive OFDM symbols in order of the SSS and PSS, since a legacy UE may recognize an NCT CC, the SSS and PSS are separated by one or more subframes or the SSs are successively allocated in order of the PSS and SSS.

If the SSS is located on an OFDM symbol n (where n is one of integers from 0 to 13) of a subframe and the PSS is located on OFDM symbol n+3 of the subframe, the legacy UE may have a risk of recognizing a corresponding frame as a TDD frame. Accordingly, it is desirable that the SSS be located on OFDM symbol n of the subframe and the PSS not be located on OFDM symbol n+3. For example, referring to FIG. 13(b), the SSs may be allocated such that the SSS and the PSS are located on OFDM symbol 0 and OFDM symbol 2 of one of two slots in a subframe, respectively. Alternatively, the PSS and the SSS may be located in OFDM symbol 0 and OFDM symbol 2 of one of two slots in a subframe, respectively.

Locations of OFDM symbols to which the PSS and the SSS are mapped in a subframe having a UE-specific RS are listed below.

TABLE 6

|  | PSS | SSS |
| --- | --- | --- |
| OFDM symbol index | 0 of $1^{st}$ slot | 1 of $1^{st}$ slot |
|  | 0 of $1^{st}$ slot | 2 of $1^{st}$ slot |
|  | 0 of $1^{st}$ slot | 3 of $1^{st}$ slot |
|  | 0 of $1^{st}$ slot | 4 of $1^{st}$ slot |
|  | 1 of $1^{st}$ slot | 0 of $1^{st}$ slot |
|  | 1 of $1^{st}$ slot | 2 of $1^{st}$ slot |
|  | 1 of $1^{st}$ slot | 3 of $1^{st}$ slot |
|  | 1 of $1^{st}$ slot | 4 of $1^{st}$ slot |
|  | 2 of $1^{st}$ slot | 0 of $1^{st}$ slot |
|  | 2 of $1^{st}$ slot | 1 of $1^{st}$ slot |
|  | 2 of $1^{st}$ slot | 3 of $1^{st}$ slot |
|  | 2 of $1^{st}$ slot | 4 of $1^{st}$ slot |
|  | 3 of $1^{st}$ slot | 0 of $1^{st}$ slot |
|  | 3 of $1^{st}$ slot | 1 of $1^{st}$ slot |
|  | 3 of $1^{st}$ slot | 2 of $1^{st}$ slot |
|  | 3 of $1^{st}$ slot | 4 of $1^{st}$ slot |
|  | 4 of $1^{st}$ slot | 0 of $1^{st}$ slot |
|  | 4 of $1^{st}$ slot | 1 of $1^{st}$ slot |
|  | 4 of $1^{st}$ slot | 2 of $1^{st}$ slot |
|  | 4 of $1^{st}$ slot | 3 of $1^{st}$ slot |
|  | 0 of $2^{nd}$ slot | 1 of $2^{nd}$ slot |
|  | 0 of $2^{nd}$ slot | 2 of $2^{nd}$ slot |
|  | 0 of $2^{nd}$ slot | 3 of $2^{nd}$ slot |
|  | 0 of $2^{nd}$ slot | 4 of $2^{nd}$ slot |
|  | 1 of $2^{nd}$ slot | 0 of $2^{nd}$ slot |
|  | 1 of $2^{nd}$ slot | 2 of $2^{nd}$ slot |
|  | 1 of $2^{nd}$ slot | 3 of $2^{nd}$ slot |
|  | 1 of $2^{nd}$ slot | 4 of $2^{nd}$ slot |
|  | 2 of $2^{nd}$ slot | 0 of $2^{nd}$ slot |
|  | 2 of $2^{nd}$ slot | 1 of $2^{nd}$ slot |
|  | 2 of $2^{nd}$ slot | 3 of $2^{nd}$ slot |
|  | 2 of $2^{nd}$ slot | 4 of $2^{nd}$ slot |
|  | 2 of $2^{nd}$ slot | 0 of $2^{nd}$ slot |
|  | 2 of $2^{nd}$ slot | 1 of $2^{nd}$ slot |
|  | 2 of $2^{nd}$ slot | 2 of $2^{nd}$ slot |
|  | 2 of $2^{nd}$ slot | 4 of $2^{nd}$ slot |
|  | 4 of $2^{nd}$ slot | 0 of $2^{nd}$ slot |
|  | 4 of $2^{nd}$ slot | 1 of $2^{nd}$ slot |
|  | 4 of $2^{nd}$ slot | 2 of $2^{nd}$ slot |
|  | 4 of $2^{nd}$ slot | 3 of $2^{nd}$ slot |

If the PSS or SSS collides with the CSI-RS, i.e. if a time-frequency resource carrying the PSS or SSS and a time-frequency resource carrying the CSI-RS overlap, the CSI-RS may not be transmitted on a resource in which the PSS/SSS collides with the CSI-RS and only the SS may be transmitted on the resource.

In summary, the PSS and SSS may be located on OFDM symbols on which the CRS and UE-specific RS are not present among OFDM symbols in one subframe and simultaneously the PSS and SSS may be located on OFDM symbol n and OFDM symbol (n±k) (where k is a natural number greater than 1). Alternatively, the PSS and SSS may be located on OFDM symbols on which the CRS and UE-specific RS are not present among OFDM symbols in one subframe and simultaneously the PSS and the SSS may be located on OFDM symbol n and OFDM symbol n+1, respectively.

If the duration between the PSS and the SSS increases, since the increased duration affects synchronization performance, it is desirable that the PSS and SSS be located on contiguous OFDM symbols. In Table 5 or Table 6, if OFDM symbols 1 and 2 of the first slot are used for the PSS and SSS or for the SSS and PSS, the duration between the contiguous PSS and SSS is maintained identically or nearly similarly to the distance between a contiguous PSS and SSS on an LCT CC with respect to all of FDD with a normal CP, FDD with an extended CP, TDD with a normal CP, and TDD with an extended CP and simultaneously, transmission of RSs and transmission of the PSS/SSS can be prevented from colliding even when the CRS, UE-specific RS, and CSI-RS are used on an NCT CC similarly on the LCT CC. Accordingly, if OFDM symbol 1 and OFDM symbol 2 of the first slot are used for the SSs, the PSS and SSS or the SSS and PSS may be located in the same position with respect to all of FDD with a normal CP, FDD with an extended CP, TDD with a normal CP, and TDD with an extended CP.

If locations of the PSS and SSS are changed differently from legacy locations, a location of a PDCCH may be considered together with locations of a CRS, a DRS, and a CSI-RS. This may serve to avoid collision with other physical signals and physical channels transmitted by an eNB transmitting the PSS/SSS in a subframe to which the PSS/SSS is mapped or to avoid interference with physical signals and physical channels transmitted by another eNB in the subframe. For instance, the following situations may be considered.

1) FDD with Normal CP

Figure 14:
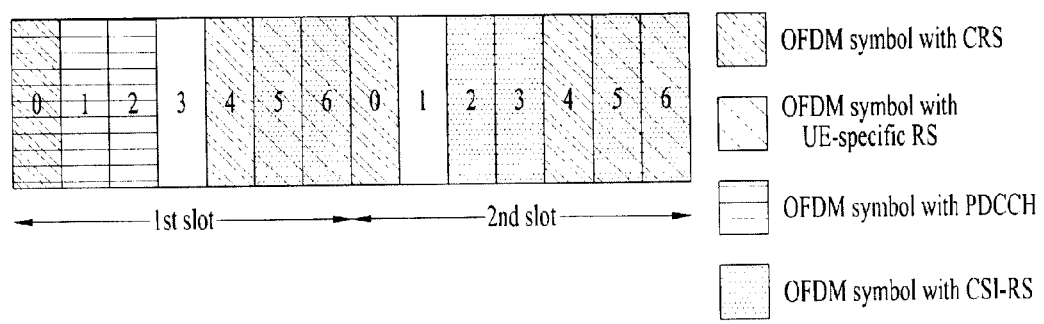
FIG. 14 illustrates another example of locations of a PSS and an SSS in a subframe on an NCT CC according to an embodiment of the present.

FIG. 14 illustrates another example of locations of a PSS and an SSS in a subframe on an NCT CC according to an embodiment of the present.

In the case of FDD with a normal CP, a PDCCH, a CSI-RS, a CRS, and a UE-specific RS may be located in one subframe as illustrated in FIG. 14. A PSS and an SSS may be located on positions except for positions of OFDM symbols on which the CRS and UE-specific RS are located. In this case, the PSS and SSS may be located on OFDM symbol 3 of the first slot of subframe A (where A is one of integers 0 to 9) and OFDM symbol 1 of the second slot of subframe B (where B is one of integers 0 to 9) in order of the PSS and SSS or in order of the SSS and PSS. Subframe A and subframe B may be different subframes, contiguous subframes, or the same subframe. In particular, the present invention proposes that OFDM symbol 3 of the first slot and OFDM symbol 1 of the second slot of the same subframe be used for the PSS and SSS, respectively, or for the SSS and PSS, respectively.

2) FDD with Extended CP

Figure 15:
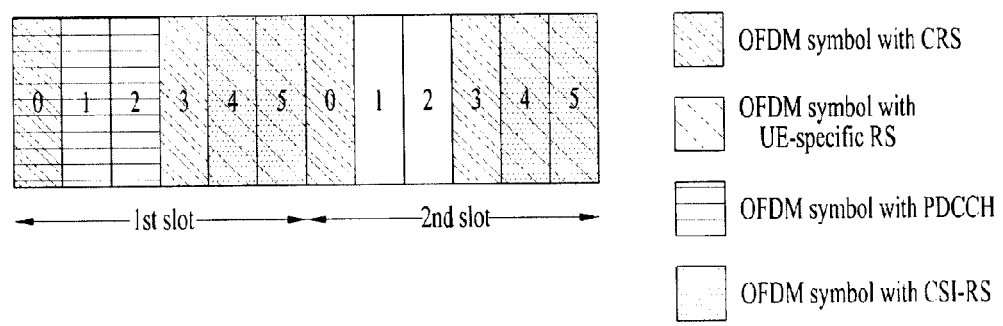
FIG. 15 illustrates another example of locations of a PSS and an SSS in a subframe on an NCT CC according to an embodiment of the present.

FIG. 15 illustrates another example of locations of a PSS and an SSS in a subframe on an NCT CC according to an embodiment of the present.

In the case of FDD with an extended CP, a PDCCH, a CSI-RS, a CRS, and a UE-specific RS may be located in one subframe as illustrated in FIG. 15. A PSS and an SSS may be located on OFDM symbols other than OFDM symbols on which the CRS and UE-specific RS are located. In this case, the PSS and SSS may be located on OFDM symbol 1 of the second slot of subframe A (where A is one of integers 0 to 9) and OFDM symbol 2 of the second slot of subframe B (where B is one of integers 0 to 9) in order of the PSS and SSS or in order of the SSS and PSS. Subframe A and subframe B may be different subframes, contiguous subframes, or the same subframe. In particular, the present invention proposes that OFDM symbol 1 of the second slot and OFDM symbol 2 of the second slot of the same subframe be used for the PSS and SSS, respectively, or for the SSS and PSS, respectively.

3) TDD with Normal CP

In the case of TDD with a normal CP, a PSS and/or an SSS may be located in the same manner as the case of FDD with the normal CP with respect to a DL subframe. In this case, OFDM symbol 3 of the first slot and OFDM symbol 1 of the second slot of the DL subframe may be used for the SSs. Alternatively, the PSS or SSS may be located on OFDM symbol 2 of the first slot in which the PDCCH is not transmitted among OFDM symbols of subframe 1 and subframe 6.

Accordingly, for the PSS and the SSS, OFDM symbol 3 of the first slot and OFDM symbol 3 of the second slot of a DL subframe, OFDM symbol 2 of subframe 1, and OFDM symbol 2 of subframe 6 may be used.

Especially, in TDD with the normal CP, the SSs may be located in order of the PSS and the SSS or in order of the SSS and the PSS on OFDM symbol 3 of the first slot and OFDM symbol 1 of the second slot of the DL subframe (e.g. subframe 0 or 5).

Especially, in TDD with the normal CP, the SSs may be located in order of the PSS and SSS or in order of the SSS and PSS on OFDM symbol 3 of the first slot or OFDM symbol 1 of the second slot of the DL subframe (e.g. subframe 0 or 5), and OFDM symbol 1 of the first slot of subframe 1 or 6. In particular, the present invention proposes that OFDM symbol 3 of the first slot or OFDM symbol 1 of the second slot of subframe 0 (and/or subframe #5) and OFDM symbol 2 of the first slot of subframe 1 (and/or subframe 6) be used for the PSS and SSS or for the SSS and PSS.

4) TDD with Extended CP

In the case of TDD using an extended CP, a PSS and/or an SSS may be located in the same manner as the case of FDD with the extended CP with respect to a DL subframe. In this case, OFDM symbol 1 of the second slot and OFDM symbol 2 of the second slot of the DL subframe may be used for the SSs. Alternatively, the PSS or SSS may be located on OFDM symbol 2 of the first slot on which a PDCCH is not transmitted among OFDM symbols of subframe 1 and subframe 6.

Accordingly, for the PSS and the SSS, OFDM symbol 1 of the second slot and OFDM symbols of the second slot of the DL subframe, and OFDM symbol 2 of a special subframe may be used.

Especially, in TDD with the extended CP, the SSs may be located in order of the PSS and SSS or in order of the SSS and PSS on OFDM symbol 1 of the second slot and OFDM symbol 2 of the second slot of the DL subframe (e.g. subframe 0 or 5).

Especially, in TDD with the extended CP, the SSs may be located in order of the PSS and SSS or in order of the SSS and PSS on OFDM symbol 1 of the second slot or OFDM symbol 2 of the second slot of the DL subframe (e.g. subframe 0 or 5), and OFDM symbol 2 of the first slot of subframe 1 or 6. In particular, the present invention proposes that OFDM symbol 1 of the second slot or OFDM symbol 2 of the second slot of subframe 0 (and/or subframe 5) and OFDM symbol 2 of the first slot of subframe 1 (and/or subframe 6) be used for the PSS and SSS or for the SSS and PSS.

5) Differentiation Between Normal CP and Extended CP

In the case of FDD with the normal CP, OFDM symbol 3 of the first slot and OFDM symbol 1 of the second slot of a subframe may be used for SSs. In the case of FDD with the extended CP, OFDM symbol 1 of the second slot and OFDM symbol 2 of the second slot of a subframe may be used for the SSs. In this case, the normal CP and the extended CP may be distinguished by the distance difference between a PSS and an SSS.

In the case of TDD with the normal CP, OFDM symbol 3 of the second slot and the first OFDM symbol of the second slot of a DL subframe (e.g. subframe 0 or 5) may be used for the SSs. In the case of FDD with the extended CP, OFDM symbol 1 of the second slot and OFDM symbol 2 of the second slot of a DL subframe (e.g. subframe 0 or 5) may be used for the SSs. Here, the normal CP and the extended CP may be distinguished by the distance difference between the PSS and the SSS.

When locations of a PDCCH, a CRS, a DRS, and a CSI-RS are considered as described above in order to determine locations of the PSS and the SSS on an NCT CC, in the case of FDD with the normal CP, since the PSS and the SSS are separated by a significant distance, detection and synchronization performance of the SSs may be deteriorated. To solve this problem, some of OFDM symbols on which the CSI-RS is located may be used for the PSS and the SSS. Referring to FIG. 14, OFDM symbols which are not used for transmission of a UE-specific RS but are used for transmission of the CSI-RS are OFDM symbol 2 and OFDM symbol 3 of the second slot. It may be considered that some or all of these OFDM symbols are used for transmission of the PSS and the SSS. Accordingly, OFDM symbol 2 and OFDM symbol 3 of the second slot, which are not used for transmission of the UE-specific RS but are used for transmission of the CSI-RS, and OFDM symbol 1 of the second slot, which is not used for transmission of any one of the PDCCH, UE-specific RS, CSI-RS, and CRS, may be used for the PSS and the SSS. Among these three OFDM symbols, the PSS and SSS may be located on two OFDM symbols. Especially, in consideration of the distance between the PSS and the SSS, OFDM symbol 2 or OFDM symbol 3 of the second slot and OFDM symbol 1 of the second slot may be used. The SSs may be arranged in order of the PSS and SSS or in order of the SSS and PSS on the two OFDM symbols.

Locations of the PSS and the SSS in TDD with the normal CP may be determined by the same principle of FDD with the normal CP. Some of OFDM symbols on which the CSI-RS is located may be used for the PSS and the SSS in the case of TDD with the normal CP. Referring to FIG. 14, OFDM symbols, which are not used for transmission of the UE-specific RS but are used for transmission of the CSI-RS, are OFDM symbol 2 and OFDM symbol 3 of the second slot. Accordingly, among OFDM symbols of the DL subframe, OFDM symbol 2 and OFDM symbol 3 of the second slot, which are not used for transmission of the UE-specific RS but are used for transmission of the CSI-RS, and OFDM symbol 1 of the second slot, which is not used for transmission of any one of the PDCCH, UE-specific RS, CSI-RS, and CRS, may be used for transmission of the PSS and SSS. In addition, OFDM symbol 2 of the first slot of subframe 1 or 6 may be used for the SSs. Especially, in consideration of the distance between the PSS and the SSS, OFDM symbol 2 or OFDM symbol 3 of the second slot and OFDM symbol 1 of the second slot may be used. The SSs may be arranged in order of the PSS and SSS or in order of the SSS and PSS on two OFDM symbols. As another example, in consideration of the distance between the PSS and SSS, OFDM symbol 1 of the second slot of a DL subframe (e.g. subframe 0 or 5) and OFDM symbol 2 of the first slot of subframe 1 or 6 may be used for the PSS and SSS. The SSs may be arranged in order of the PSS and SSS or in order of the SSS and PSS on corresponding OFDM symbols.

All or some OFDM symbols used for transmission of the PSS/SSS and OFDM symbols for transmission of a CSI-RS on an NCT CC may overlap. In this case, it is proposed that the CSI-RS be punctured on a subcarrier carrying the PSS/SSS (or in an RB including a PSS/SSS RE or center 6 RBs carrying the PSS/SSS) on OFDM symbols on which both the PSS/SSS and the CSI-RS are configured and the PSS/SSS be transmitted on the subcarrier. For example, when OFDM symbol 2 of the second slot and OFDM symbol 1 of the second slot are used for the PSS/SSS in a subframe with the extended CP, OFDM symbol 2 and OFDM symbol 3 of the second slot may include a CSI-RS RE. Here, the CSI-RS may be punctured on a subcarrier carrying the PSS/SSS on OFDM symbol 2 of the second slot (or in an RB including a PSS/SSS RE or center 6 RBs carrying the PSS/SSS) and the PSS/SSS may be transmitted on the corresponding subcarrier. Accordingly, if an OFDM symbol configured as the CSI-RS and an OFDM symbol for transmission of the PSS/SSS collide, a UE receives the PSS/SSS on a subcarrier configured as a transmission resource of the PSS/SSS (or in an RB including the transmission resource of the PSS/SSS or center 6 RBs carrying the PSS/SSS) and assumes that the CSI-RS is not transmitted on the corresponding resource.

Meanwhile, the PSS and the SSS which are transmitted twice in a radio frame of 10 ms on an LCT CC may be configured to be transmitted on an NCT CC only once. In this case, a legacy UE cannot detect the SSs but an NCT UE may perform synchronization of the NCT CC using the PSS and SSS and simultaneously detect a radio frame boundary of 10 ms. Alternatively, the NCT UE may detect the frame boundary of 10 ms by locating three or more PSSs and SSSs at an unequal interval during a radio frame of 10 ms. This can be extended such that k PSSs/SSSs are located at an unequal interval during a duration of n*10 ms and thus the NCT UE can detect the boundary of 10 ms.

Currently, for the PSS, three distinguishable sequences are present and these sequences may be distinguished by a root index. For the SSS, there are 168 distinguishable sequences and the sequences are distinguished by two indexes m0 and m1. If the PSS and SSS are used to perform synchronization on an NCT CC, the following scheme may be applied to each of the PSS and the SSS or to both the PSS and the SSS. First, sequences used for the first SS and the second SS transmitted in one radio subframe may be different. In this case, the sequence of the first PSS and the sequence of the second PSS may be distinguished by a root index and the sequence of the first SSS and the sequence of the second SSS may be distinguished by two indexes of m0 and m1. Alternatively, one sequence may be used for the SSs and different cyclic shifts may be applied to the first SS and the second SS in the frequency domain or time domain. This can be extended such that one sequence is used for the SSs and different cyclic shifts are applied to multiple SSs in the frequency domain or time domain.

6) Transmission of PSS/SSS Using CSI-RS Resource or CRS Resource

A PSS and an SSS may be configured in REs to which a CSI-RS has a probability of being allocated (hereinafter, a CSI-RS RE).

Table 7 and Table 8 illustrate CSI-RS configurations which may be used in a frame structure for FDD (hereinafter, FS-1) explained in FIG. 1(*a*) and a frame structure for TDD (hereinafter, FS-2) explained in FIG. 1(*b*). A CSI-RS configuration refers to locations of REs occupied by CSI-RSs in one RB pair and is also called a CSI-RS pattern. Specifically, Table 7 illustrates CSI-RS configurations in a subframe with a normal CP and Table 8 illustrates CSI-RS configurations in a subframe with an extended CP.

TABLE 7

| CSI reference signal configuration | | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| FS1 and FS2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |
| FS2 only | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |
| | 29 | (2, 1) | 1 | | | | |
| | 30 | (1, 1) | 1 | | | | |
| | 31 | (0, 1) | 1 | | | | |

TABLE 8

| CSI reference signal configuration | | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| FS1 and FS2 | 0 | (11, 4) | 0 | (11, 4) | 0 | (11, 4) | 0 |
| | 1 | (9, 4) | 0 | (9, 4) | 0 | (9, 4) | 0 |
| | 2 | (10, 4) | 1 | (10, 4) | 1 | (10, 4) | 1 |
| | 3 | (9, 4) | 1 | (9, 4) | 1 | (9, 4) | 1 |
| | 4 | (5, 4) | 0 | (5, 4) | 0 | | |
| | 5 | (3, 4) | 0 | (3, 4) | 0 | | |
| | 6 | (4, 4) | 1 | (4, 4) | 1 | | |
| | 7 | (3, 4) | 1 | (3, 4) | 1 | | |
| | 8 | (8, 4) | 0 | | | | |
| | 9 | (6, 4) | 0 | | | | |
| | 10 | (2, 4) | 0 | | | | |
| | 11 | (0, 4) | 0 | | | | |
| | 12 | (7, 4) | 1 | | | | |
| | 13 | (6, 4) | 1 | | | | |
| | 14 | (1, 4) | 1 | | | | |
| | 15 | (0, 4) | 1 | | | | |
| FS2 only | 16 | (11, 1) | 1 | (11, 1) | 1 | (11, 1) | 1 |
| | 17 | (10, 1) | 1 | (10, 1) | 1 | (10, 1) | 1 |
| | 18 | (9, 1) | 1 | (9, 1) | 1 | (9, 1) | 1 |
| | 19 | (5, 1) | 1 | (5, 1) | 1 | | |
| | 20 | (4, 1) | 1 | (4, 1) | 1 | | |
| | 21 | (3, 1) | 1 | (3, 1) | 1 | | |
| | 22 | (8, 1) | 1 | | | | |
| | 23 | (7, 1) | 1 | | | | |
| | 24 | (6, 1) | 1 | | | | |
| | 25 | (2, 1) | 1 | | | | |
| | 26 | (1, 1) | 1 | | | | |
| | 27 | (0, 1) | 1 | | | | |

If (k',l') and $n_s$ of Table 7 or Table 8 is applied to the following equation, an RE used by each antenna port carrying a CSI-RS (hereinafter, a CSI-RS port) for transmission of the CSI-RS may be determined. That is, in a subframe configured for transmission of the CSI-RS (hereinafter, a CSI-RS subframe), a CSI-RS sequence is mapped to complex-valued modulation symbols $a^{(p)}_{k,l}$ used as reference symbols on a CSI-RS port p according to the following equation.

$$a_{k,l}^{(p)} = w_{l''} \cdot r_{l,n_s}(m') \qquad \text{[Equation 12]}$$

In Equation 12, a resource index pair (k,l) used by the CSI-RS port p for transmission of the CSI-RS is determined according to the following equation.

$$k = k' + 12m + \begin{cases} -0 \text{ for } p \in \{15, 16\}, \text{ normal cyclic prefix} \\ -6 \text{ for } p \in \{17, 18\}, \text{ normal cyclic prefix} \\ -1 \text{ for } p \in \{19, 20\}, \text{ normal cyclic prefix} \\ -7 \text{ for } p \in \{21, 22\}, \text{ normal cyclic prefix} \\ -0 \text{ for } p \in \{15, 16\}, \text{ extended cyclic prefix} \\ -3 \text{ for } p \in \{17, 18\}, \text{ extended cyclic prefix} \\ -6 \text{ for } p \in \{19, 20\}, \text{ extended cyclic prefix} \\ -9 \text{ for } p \in \{21, 22\}, \text{ extended cyclic prefix} \end{cases} \qquad \text{[Equation 13]}$$

$$l = l' + \begin{cases} l'' & \text{CSI reference signal configurations 0-19,} \\ & \text{normal cyclic prefix} \\ 2l'' & \text{CSI reference signal configurations 20-31,} \\ & \text{normal cyclic prefix} \\ l'' & \text{CSI reference signal configurations 0-27,} \\ & \text{extended cyclic prefix} \end{cases}$$

$$w_{l''} = \begin{cases} 1 & p \in \{15, 17, 19, 21\} \\ (-1)^{l''} & p \in \{16, 18, 20, 22\} \end{cases}$$

$$l'' = 0, 1$$

$$m = 0, 1, \ldots, N_{RB}^{DL} - 1$$

$$m' = m + \left\lfloor \frac{N_{RB}^{max,DL} - N_{RB}^{DL}}{2} \right\rfloor$$

Figure 16:
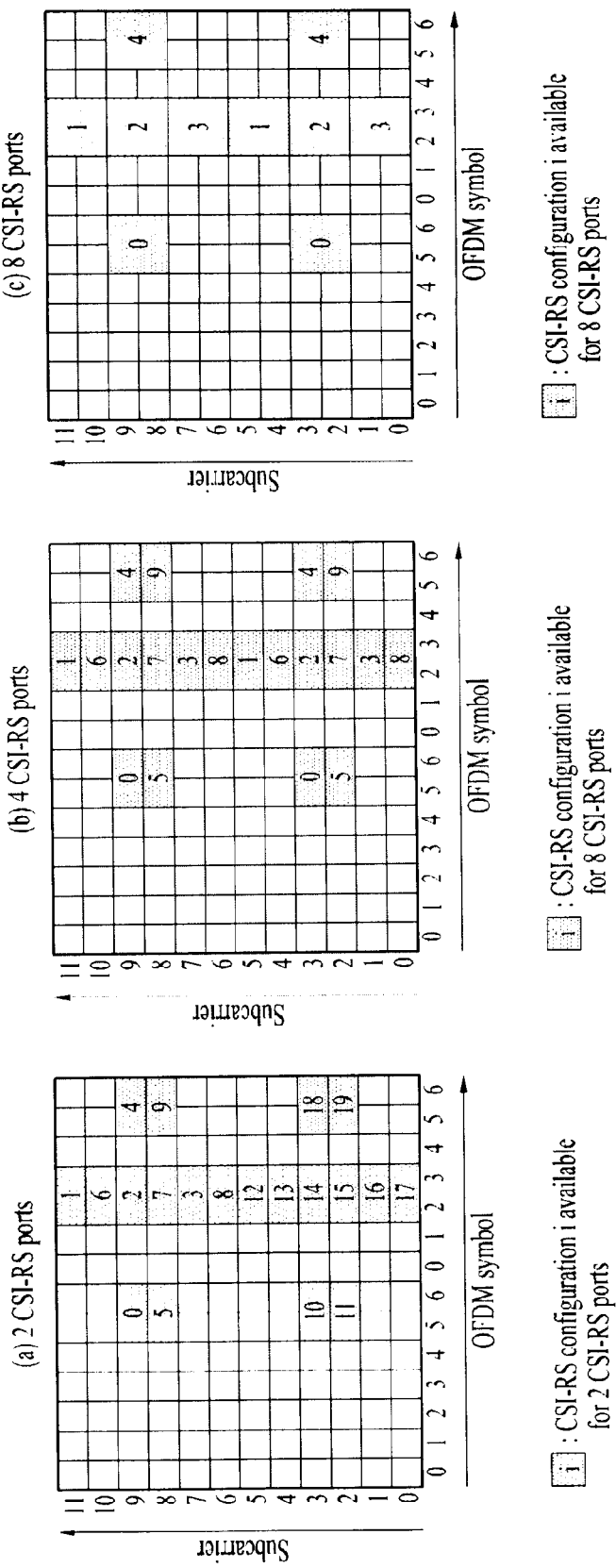
FIG. 16 illustrates channel state information reference signal (CSI-RS) configurations.

FIG. 16 illustrates CSI-RS configurations. Specifically, FIG. 16(a) illustrates 20 CSI-RS configurations 0 to 19 which can be used for CSI-RS transmission through two CSI-RS ports among the CSI-RS configurations of Table 7, FIG. 16(b) illustrates 10 CSI-RS configurations 0 to 9 which can be used for CSI-RS transmission through four CSI-RS ports among the CSI-RS configurations of Table 7, and FIG. 16(c) illustrates 5 CSI-RS configurations 0 to 4 which can be used through 8 CSI-RS ports among the CSI-RS configurations of Table 7.

Referring to Table 7, Equation 13, and FIG. 16, in the case of FDD with a normal CP, the CSI-RS may be mapped to OFDM symbols 2 and 3 or OFDM symbols 5 and 6. If SSs are transmitted using CSI-RS REs, even if a subframe corresponding to a PSS/SSS transmission time is equal to a CSI-RS transmission time, a UE assumes that the CSI-RS is not transmitted in the subframe. OFDM symbols including CSI-RS REs used for transmission of the PSS/SSS may be separately defined with respect to FDD and TDD. Referring to Table 7 and Equation 13, in the case of TDD with the normal CP, CSI-RS REs included in OFDM symbols 1 and 3 may be used for transmission of the PSS and SSS. In the case of TDD with an extended CP, OFDM symbols 1 and 2 may be used for transmission of the PSS/SSS. The PSS and SSS may be mapped in order of the PSS and SSS or may be reversely mapped in order of the SSS and PSS. That is, assuming that OFDM symbols 1 and 3 are used, the PSS may be mapped to OFDM symbol 1 and the SSS may be mapped to OFDM symbol 3, or vice versa.

The PSS and SSS may be transmitted using a resource for a CRS. Referring to FIG. 6, CRSs of port 0 are located on OFDM symbols 0 and 3. In this case, the PSS and SSS may be mapped to OFDM symbols 0 and 3, respectively, or OFDM symbols 3 and 1, respectively. To distinguish between FDD and TDD, in FDD, the PSS and SSS may be mapped to OFDM symbols 0 and 3, respectively, and in TDD, the PSS and SSS may be mapped to OFDM symbols 3 and 0, respectively. Alternatively, mapping may be reversely performed. In this case, it is assumed that the CRS and the PSS/SSS are not transmitted in the same subframe. Meanwhile, if four ports are present, OFDM symbol 1 for a CRS corresponding to antenna port 2 and one of OFDM symbols 3 and 4 may be used for the PSS and SSS. The PSS and SSS may be located on two symbols among OFDM symbols 1, 3, and 4 and order thereof may be changed. To distinguish between FDD and TDD, an OFDM symbol for the PSS and an OFDM symbol for the SSS may be defined so that a gap between the PSS and the SSS may differ in FDD and TDD.

7) Information Using Locations of PSS and SSS

A UE may be informed of information about a cell using locations of a PSS and an SSS on an NCT CC. When both the PSS and the SSS are present on the NCT CC, the following information can be expressed using locations of the PSS and the SSS.

① Use of difference in distance between PSS and SSS
FDD and TDD may be distinguished by differently setting the distance difference between the PSS and the SSS, i.e. the time difference between transmission times of the PSS and the SSS, used in FDD and the distance difference between the PSS and the SSS, i.e. the time difference between transmission times of the PSS and the SSS, used in TDD. Conventionally, it has been assumed that aggregated CCs are aggregated by the same duplex mode. However, an aggregation of CCs operating in different duplex modes needs to be permitted. In this case, the present invention is advantageous in that an NCT UE can recognize a duplex mode by which an NCT CC is configured even if information indicating the duplex mode of the CCs is not additionally signaled to the UE.

An extended CP and a normal CP may be distinguished by differently setting the distance difference between the PSS and the SSS used in a subframe for the extended CP and the distance difference between the PSS and the SSS used in a subframe for the normal CP.

② Use of order of PSS and SSS (PSS/SSS swapping)
FDD and TDD may be distinguished by swapping order of the PSS and the SSS used in FDD and order of the PSS and the SSS used in TDD. In this case, the PSS and SSS may be located on contiguous OFDM symbols or on separate OFDM symbols. The distance difference between the PSS and SSS for FDD and the distance difference between the PSS and SSS for TDD may be equal or different.

An extended CP and a normal CP may be distinguished by swapping order of PSS and the SSS in a subframe for the extended CP and order of the PSS and SSS in a subframe for the normal CP. In this case, the PSS and the SSS may be located on contiguous OFDM symbols or on separate OFDM symbols. The distance difference between the PSS and the SSS for the extended CP and the distance difference between the PSS and the SSS for the normal CP may be equal or different.

4. New SS

To prevent a legacy UE from detecting an SS on an NCT CC, a new sequence rather than a legacy PSS/SSS may be used on the NCT CC. Since it is not necessary to obtain a cell ID through an SS on the NCT CC when the NCT CC is used as an SCC, the SS need not be determined according to the cell ID as in a legacy scheme. Hence, new sequences may be used on the NCT CC. Alternatively, legacy SS sequences may be independently used without concatenation to the cell ID. When N sequences are present for synchronization, an eNB informs a UE of index n (where n=0, 1, . . . , (N-1)) of a sequence used for synchronization of the NCT CC or of a group to which the sequence index n belongs so that the UE can detect an SS of the NCT CC. If new sequences are used as the SS on the NCT CC, since the new sequences are SSs not used by the legacy UE, the legacy UE can be prevented from detecting the SS of the NCT CC.

When the new sequences are used for synchronization of the NCT CC, a PSS and an SSS may be transmitted only once during a duration corresponding to a multiple of 10 ms so that an NCT UE may detect a radio frame boundary of 10 ms. The NCT UE may detect the frame boundary of 10 ms by locating two or more SSs at an unequal interval during a radio frame of 10 ms, i.e. by transmitting the PSS and the SSS twice or more at an unequal interval. This can be extended such that k SSs are located at an unequal interval during a duration of n*10 ms and thus the UE can detect the boundary of 10 ms. Alternatively, two or more different new SSs may be used so that the NCT UE can detect the radio frame boundary of 10 ms.

5. Change and Extension of Time and/or Frequency Location of SS

In addition to the above-described embodiments, time and/or frequency locations in which an SS for an NCT CC is transmitted may be variously changed to prevent a legacy UE from detecting the SS of the NCT CC.

Figure 17:
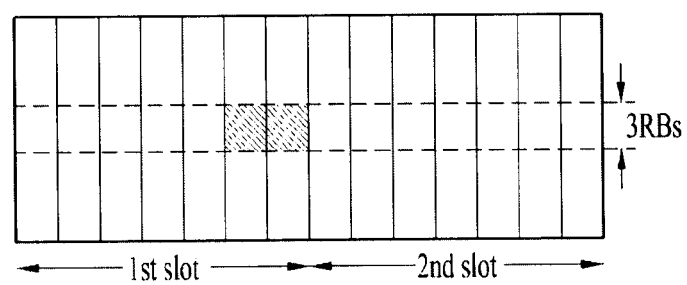
FIG. 17 illustrates an example of location of a synchronization signal (SS) in a subframe on an NCT CC according to an embodiment of the present invention.

FIG. 17 illustrates an example of location of an SS in a subframe on an NCT CC according to an embodiment of the present invention.

For example, an SS transmitted in 6 RBs on an LCT CC may be transmitted only in 3 RBs. Referring to FIG. 17, SSs transmitted on one OFDM symbol of a subframe in 6 RBs on an LCT CC may be transmitted on 2 OFDM symbols in 3 RBs on an NCT CC throughout 3 RBs.

Figure 18:
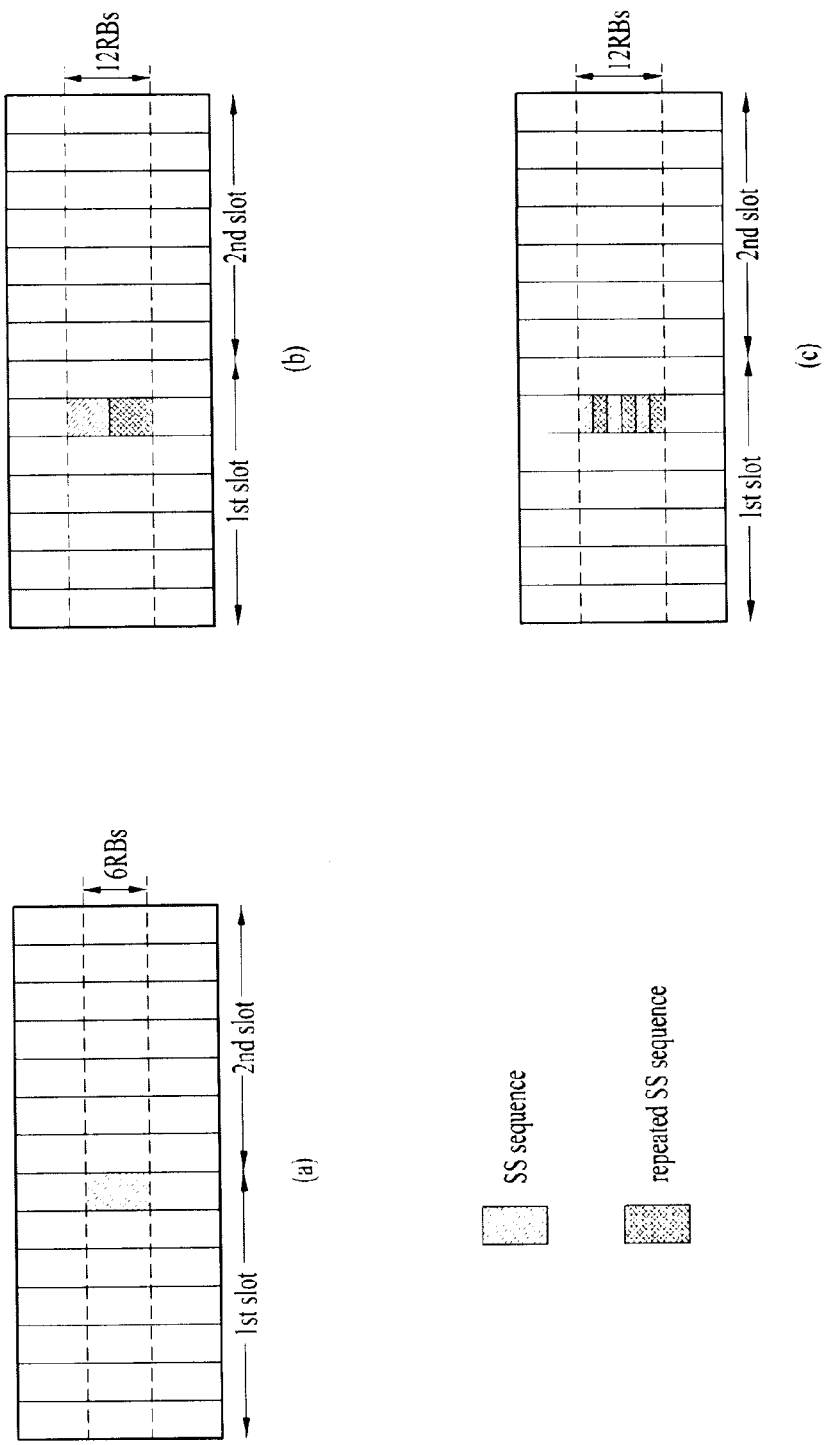
FIG. 18 illustrates another example of location of an SS in a subframe on an NCT CC according to an embodiment of the present invention.

FIG. 18 illustrates another example of location of an SS in a subframe on an NCT CC according to an embodiment of the present invention.

A legacy sequence transmitted in 6 RBs as illustrated in FIG. 18(a) may be transmitted in k*6 RBs through repetition of n times as illustrated in FIG. 18(b) or FIG. 18(c). For example, referring to FIG. 18(b), when an SS is transmitted in 12 RBs, repeated sequences may be successively transmitted in 12 RBs in the frequency domain. As another example, the repeated sequences may be transmitted alternately with legacy sequences as illustrated in FIG. 18(c).

Figure 19:
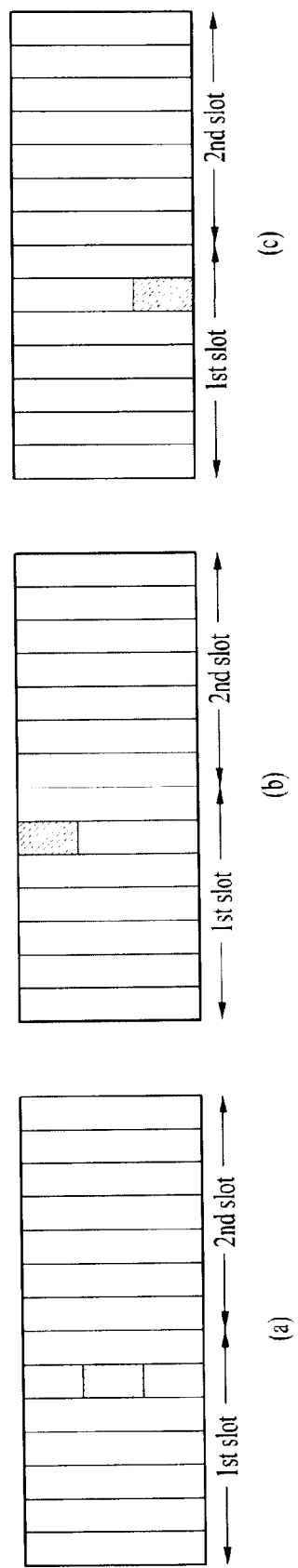
FIG. 19 illustrates another example of location of an SS in a subframe on an NCT CC according to an embodiment of the present invention.

FIG. 19 illustrates another example of location of an SS in a subframe on an NCT CC according to an embodiment of the present invention.

To prevent a legacy UE which cannot use an NCT CC from detecting the NCT CC, an SS of the NCT CC may be shifted with a predetermined pattern in the frequency domain or the time domain. The shift of the SS in the frequency domain and time domain may be applied to only one of a PSS and an SSS or to each of the PSS and the SSS or may be identically applied both the PSS and the SSS. Alternatively, the above operation may also be applied when new sequences rather than sequences for a legacy PSS or SSS are used. For example, shift in the frequency domain may be applied with respect to every SS as illustrated in FIG. 19(a). The first SS is transmitted using a center frequency as illustrated in FIG. 19(a) and the second SS may be transmitted using a frequency of an upper end part of a frequency band as illustrated in FIG. 9(b). Similarly, the third SS may be transmitted using a frequency of a lower end part of a frequency band as illustrated in FIG. 9(c). These three frequency locations may be alternately applied whenever the SS is transmitted.

Figure 20:
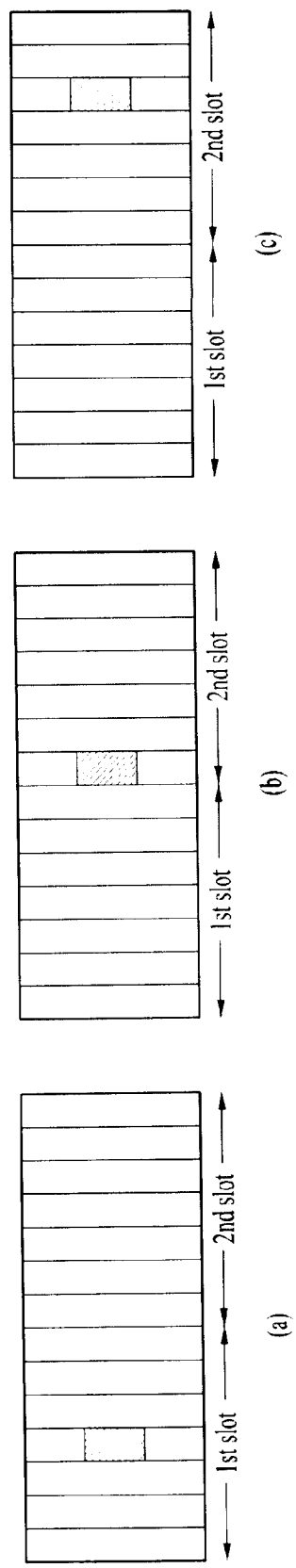
FIG. 20 illustrates another example of location of an SS in a subframe on an NCT CC according to an embodiment of the present invention.

FIG. 20 illustrates another example of location of an SS in a subframe on an NCT CC according to an embodiment of the present invention.

Referring to FIG. 20, location shift in the time domain may be applied to every SS. For example, the first SS may be transmitted using OFDM symbol 3 as illustrated in FIG. 10(a), the second SS may be transmitted using OFDM symbol 7 as illustrated in FIG. 10(b), and the third SS may be transmitted using OFDM symbol 11 (i.e. OFDM symbol 4 of the second slot). These three locations in the time domain may be alternately applied to whenever the SS is transmitted.

Figure 21:
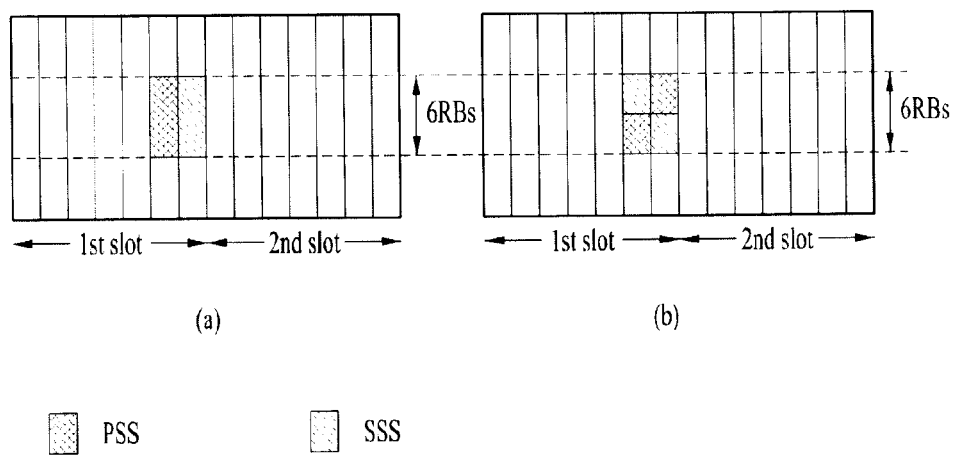
FIG. 21 illustrates another example of location of an SS in a subframe on an NCT CC according to an embodiment of the present invention.

FIG. 21 illustrates another example of location of an SS in a subframe on an NCT CC according to an embodiment of the present invention.

A hopping pattern of an SS in the frequency domain or time domain may be predefined or indicated to a UE using an NCT CC from an eNB. The hopping pattern of the SS in the frequency domain or the time domain may be fixed or may be frequently changed.

To prevent a legacy UE which cannot use the NCT CC from detecting the NCT CC, locations of a PSS and an SSS of the NCT CC in the time domain and frequency domain may be changed as illustrated in FIG. 21(b). Referring to FIG. 21(a), each of the SSS and the PSS is transmitted on one OFDM symbol in 6 RBs on the LCT CC. Referring to FIG. 21(b), 6 RBs of an OFDM symbol carrying the PSS on an LCT CC are divided into two parts and 6 RBs of an OFDM symbol carrying the SSS on the LCT CC are divided into two parts. The PSS of 3 RBs and the SSS of 3 RBs are transmitted on the first OFDM symbol and the PSS of the other 3 RBs and the SSS of the other 3 RBs are transmitted on the second OFDM symbol. In this case, locations of the PSS and SSS in the frequency domain transmitted on the second OFDM symbol may be different from locations of the PSS and SSS in the frequency domain transmitted on the first OFDM symbol.

6. Others

Figure 22:
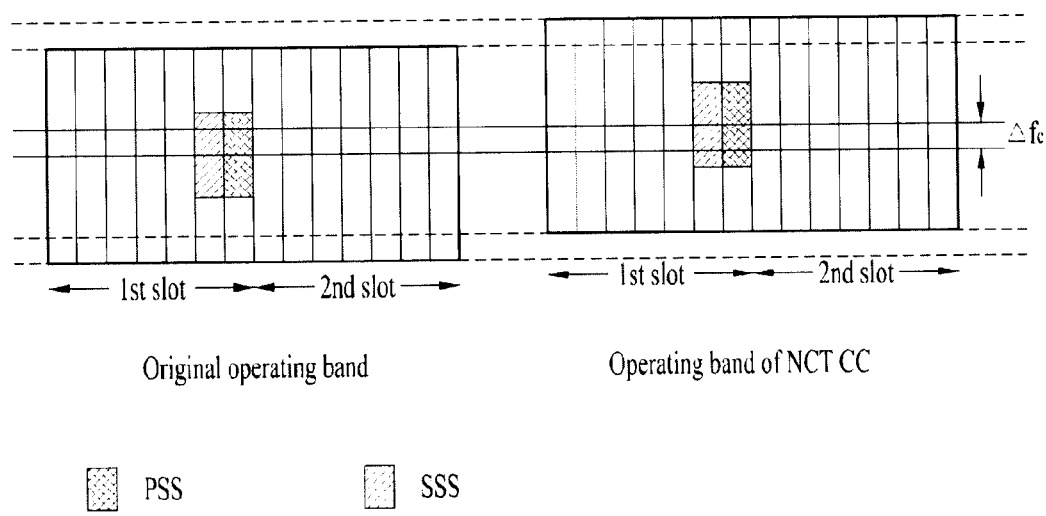
FIG. 22 illustrates an example of a center frequency of an NCT CC according to an embodiment of the present invention.

In addition to the above-described embodiments, an SS used for an NCT CC uses a legacy PSS or SSS. However, in order to prevent a legacy UE from detecting the SS of the NCT CC, both the PSS and SSS or either the PSS or SSS is interleaved to a predetermined pattern for transmission on the NCT CC. As another method, both the PSS and SSS or either the PSS or SSS generated by a legacy method may be scrambled using a predetermined sequence for transmission on the NCT CC FIG. 22 illustrates an example of a center frequency of an NCT CC according to an embodiment of the present invention.

Meanwhile, in order to prevent a legacy UE from detecting an NCT CC, the present invention proposes that a center frequency of the NCT CC be shifted from an original center frequency. For example, referring to FIG. 22, a center frequency of the NCT CC may be shifted by Δfc from an original center frequency, i.e., an original frequency raster, so that the legacy UE cannot detect the NCT CC. That is, the NCT CC and an LCT CC may be distinguished by applying an offset to an operating band of a CC. If the center frequency of the NCT CC is shifted from an original center frequency, it is desirable that a value of Δfc which is the difference between the original center frequency and the shifted center frequency not be a multiple of 300 kHz. Since the legacy UE searches for a center frequency in units of 300 KHz, a center frequency deviating from a frequency raster of 300 kHz cannot be detected. Then, the legacy UE cannot recognize the NCT CC and cannot detect an SS of the NCT CC.

Figure 23:
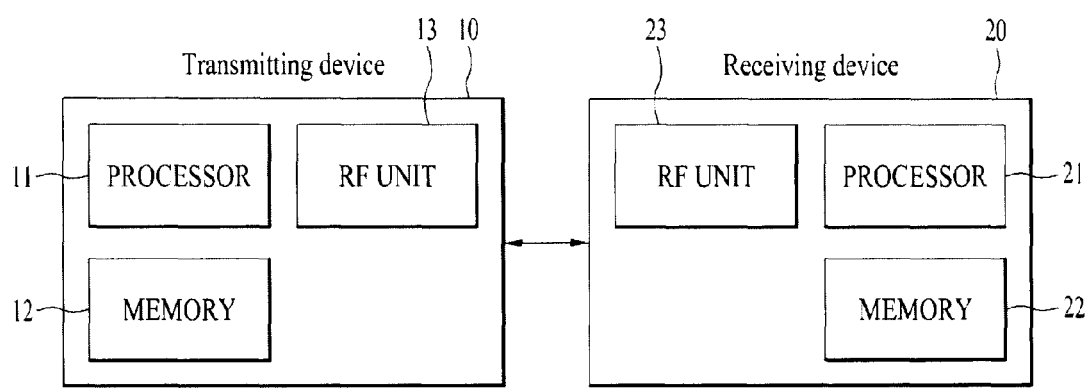
FIG. 23 is a block diagram illustrating elements of a transmitting device 10 and a receiving device 20 for implementing the present invention.

FIG. 23 is a block diagram illustrating elements of a transmitting device 10 and a receiving device 20 for implementing the present invention.

The transmitting device 10 and the receiving device 20 respectively include Radio Frequency (RF) units 13 and 23 capable of transmitting and receiving radio signals carrying information, data, signals, and/or messages, memories 12 and 22 for storing information related to communication in a wireless communication system, and processors 11 and 21 operationally connected to elements such as the RF units 13 and 23 and the memories 12 and 22 to control the elements and configured to control the memories 12 and 22 and/or the RF units 13 and 23 so that a corresponding device may perform at least one of the above-described embodiments of the present invention.

The memories 12 and 22 may store programs for processing and controlling the processors 11 and 21 and may temporarily store input/output information. The memories 12 and 22 may be used as buffers.

The processors 11 and 21 generally control the overall operation of various modules in the transmitting device and the receiving device. Especially, the processors 11 and 21 may perform various control functions to implement the present invention. The processors 11 and 21 may be referred to as controllers, microcontrollers, microprocessors, or microcomputers. The processors 11 and 21 may be implemented by hardware, firmware, software, or a combination thereof. In a hardware configuration, application specific integrated circuits (ASICs), digital signal processors (DSPs), digital signal processing devices (DSPDs), programmable logic devices (PLDs), or field programmable gate arrays (FPGAs) may be included in the processors 11 and 21. Meanwhile, if the present invention is implemented using firmware or software, the firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 performs predetermined coding and modulation for a signal and/or data scheduled to be transmitted to the outside by the processor 11 or a scheduler connected with the processor 11, and then transfers the coded and modulated data to the RF unit 13. For example, the processor 11 converts a data stream to be transmitted into K layers through demultiplexing, channel coding, scrambling, and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include $N_t$ (where $N_t$ is a positive integer) transmit antennas.

A signal processing process of the receiving device 20 is the reverse of the signal processing process of the transmitting device 10. Under control of the processor 21, the RF unit 23 of the receiving device 20 receives radio signals transmitted by the transmitting device 10. The RF unit 23 may include $N_r$ (where $N_r$ is a positive integer) receive antennas and frequency down-converts each signal received through receive antennas into a baseband signal. The processor 21 decodes and demodulates the radio signals received through the receive antennas and restores data that the transmitting device 10 intended to transmit.

The RF units 13 and 23 include one or more antennas. An antenna performs a function for transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. The signal transmitted from each antenna cannot be further deconstructed by the receiving device 20. An RS transmitted through a corresponding antenna defines an antenna from the view point of the receiving device 20 and enables the receiving device 20 to derive channel estimation for the antenna, irrespective of whether the channel represents a single radio channel from one physical antenna or a composite channel from a plurality of physical antenna elements including the antenna. That is, an antenna is defined such that a channel carrying a symbol of the antenna can be obtained from a channel carrying another symbol of the same antenna. An RF unit supporting a MIMO function of transmitting and receiving data using a plurality of antennas may be connected to two or more antennas.

In the embodiments of the present invention, a UE operates as the transmitting device 10 in UL and as the receiving device 20 in DL. In the embodiments of the present invention, an eNB operates as the receiving device 20 in UL and as the transmitting device 10 in DL. Hereinafter, the processor, RF unit, and memory included in the UE will be referred to as a UE processor, a UE RF unit, and a UE memory, respectively, and the processor, RF unit, and memory unit included in the eNB will be referred to as an eNB processor, an eNB RF unit, and an eNB memory, respectively.

The eNB processor of the present invention configures a PSS and an SSS on an LCT CC as illustrated in FIG. 9. The eNB processor controls the eNB RF unit to transmit the PSS and SSS using center 6 RBs on OFDM symbols expressed as the PSS and the SSS in FIG. 9 in every radio frame of 10 ms. The UE processor of the present invention is configured to detect the PSS and the SSS using the 6 center RBs on the OFDM symbols expressed as the PSS and the SSS in FIG. 9. The UE processor is configured to obtain a cell ID of the LCT CC, time synchronization and frequency synchronization, a radio frame boundary of 10 ms, etc., using the PSS and the SSS.

The eNB processor of the present invention may configure an SS according to any one of the above-described embodiments of the present invention. The eNB processor may control the eNB RF unit to transmit the SS configured according to any one of the above-described embodiments on an NCT CC. The UE RF unit of the present invention is configured to receive various signals (including an SS, an RS, etc.) transmitted from the eNB. The UE processor of the present invention is configured to detect the SS of the NCT CC configured according to any one of the embodiments of the present invention from signals received from the UE RF unit. The UE processor detects the SS configured according to any one of the embodiments of the present invention on the NCT CC and is configured to perform synchronization of the NCT CC using the SS. The UE processor is configured to detect a radio frame boundary of 10 ms using the SS. The UE processor may be configured to maintain time synchronization of the NCT CC by detecting a tracking RS and to adjust a frequency offset of the NCT CC.

For example, the eNB processor may configure only the PSS of the PSS and SSS and control the eNB RF unit to transmit the PSS using a time-frequency resource on the NCT CC. The eNB processor may control the eNB RF unit to transmit the PSS at a time duration other than 5 ms. The UE RF unit may be configured to receive the PSS under control of the UE processor. The UE processor may be configured to detect the PSS on the corresponding time-frequency resource of the NCT CC from signals received by the UE RF and to perform synchronization of the NCT CC carrying the PSS, using the PSS. The UE processor may detect a frame boundary of 10 ms using the PSS.

As another example, the eNB processor may configure only the SSS of the PSS and SSS on the NCT CC and control the eNB RF unit to transmit the SSS using a corresponding time-frequency resource of the NCT CC. The eNB processor may generate a sequence of the SSS using the PSS on the LCT CC managed by the eNB processor. The eNB processor may generate the sequence of the SSS such that the PSS on the LCT CC and the SSS on the NCT CC indicate the same cell IDs as physical layer cell IDs indicated by the PSS and SSS on the LCT CC. The eNB processor may control the eNB RF unit to transmit the same sequence as the SSS on the LCT CC as the SSS for synchronization of the NCT CC on the NCT CC. The eNB processor may control the eNB RF unit to transmit the SSS at a time duration other than 5 ms. The UE RF unit may be configured to receive the SSS under control of the UE processor. The UE processor may be configured to detect the SSS and perform synchronization of the NCT CC carrying the SSS using the SSS. The UE processor may be configured to use a PSS detected on a PCC or a PSS detected on an arbitrary serving CC for detection of the SSS. The UE processor may be configured to use the PSS detected on the PCC or the PSS detected on the arbitrary serving CC, and a physical layer cell ID which is obtained from the PCC or received through the arbitrary serving CC for detection of the SSS. The UE processor may detect a frame boundary of 10 ms using the SSS. If the UE is configured by carrier aggregation and the NCT CC is added as an SCC, the UE processor may acquire a cell ID using an SS of the PCC.

As a further example, the eNB processor may configure a PSS and an SSS on an NCT CC and control the eNB RF unit to transmit the PSS and SSS using corresponding time-frequency resources on the NCT CC. The UE RF unit may be configured to receive the PSS and the SSS under control of the UE processor. The UE processor may be configured to detect the PSS and the SSS on the corresponding time-frequency resources of the NCT CC. The UE processor may perform synchronization of the NCT CC carrying the PSS and the SSS using the PSS and SSS and detect a frame boundary of 10 ms.

In order to prevent a legacy UE from detecting the NCT CC, the eNB processor may be configured to generate a PSS and/or an SSS of new sequences different from sequences used as a PSS/SSS on an LCT CC and the UE processor may be configured to detect the new sequences. In order to prevent the legacy UE from detecting the NCT CC, the eNB processor may control the eNB RF unit to transmit the PSS and/or the SSS at a different time duration from a time duration of the PSS and/or the SSS of the LCT CC, on different OFDM symbols from OFDM symbols of the PSS and/or the SSS of the LCT CC, or on different frequencies from frequencies of the PSS and/or the SSS of the LCT CC or the eNB processor may control the eNB RF to transmit the PSS and/or the SSS by shifting a center frequency of the NCT CC to differ from a raster of 300 kHz.

In order to prevent transmission of a CRS, a UE-specific RS, or a CSI-RS and transmission of a PSS and/or an SSS from colliding, the eNB processor may configure SSs such that the PSS and/or the SSS are located on OFDM symbol(s) other than an OFDM symbol to which the CRS, UE-specific RS, or CSI-RS may be mapped. The UE processor may be configured to detect the PSS and/or the SSS on OFDM symbols other than the OFDM symbol to which the CRS, UE-specific RS, or CSI-RS may be mapped among OFDM symbols in a subframe corresponding to transmission times of the PSS and/or the SSS. The eNB processor may configure the PSS and/or the SSS on OFDM symbol(s) other than OFDM symbols on which a PDCCH may be transmitted. The UE processor may be configured not to detect the PSS and/or the SSS on the OFDM symbols to which the PDCCH may be mapped and may be configured to detect the PSS and/or the SSS on the other OFDM symbols.

The eNB processor may differently configure the time distance between the PSS and the SSS or the order of the PSS and the SSS in a radio frame for FDD and in a radio frame for TDD. The UE processor may distinguish between FDD and TDD based on the time distance during which the PSS and the SSS are detected or based on the order of the PSS and the SSS.

The eNB processor may differently configure the time distance between the PSS and the SSS or the order of the PSS and the SSS in a subframe for a normal CP and in a subframe for an extended CP. The UE processor may distinguish between CP lengths used in a corresponding subframe or a corresponding radio frame based on the time distance during which the PSS and SSS are detected or the order of the PSS and the SSS.

As described above, the detailed description of the preferred embodiments of the present invention has been given to enable those skilled in the art to implement and practice the invention. Although the invention has been described with reference to exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

The embodiments of the present invention are applicable to a base station, a relay, a UE, or other devices in a wireless communication system.

The invention claimed is:

1. A method for receiving a synchronization signal by a user equipment, the method comprising:
    detecting a first primary synchronization signal (PSS) and a first secondary synchronization signal (SSS) in a subframe #n;
    detecting a second PSS and a second SSS in a subframe #n+5;
    acquiring synchronization with a cell carrying the first and second PSSs and
the first and second SSSs based on the first and second PSSs and the first and second SSSs,
    wherein the first PSS is located on an OFDM symbol #m−1 among OFDM symbols #0 to #m−1 of an even-numbered slot of the subframe #n, the first SSS is located on an OFDM symbol #m−2 of the even-numbered slot of the subframe #n, the second PSS is located on an OFDM symbol #m−1 among OFDM symbols #0 to #m−1 of an even-numbered slot of the subframe #n+5 and the second SSS is located on an OFDM symbol #m−2 of the even-numbered slot of the subframe #n+5, when the cell is a legacy type cell, and
    wherein at least the first PSS or second PSS is located on an OFDM symbol other than the OFDM symbol #m−1 of the even-numbered slot in the subframe #n or #n+5 and at least the first or second SSS is located on another OFDM symbol other than the OFDM symbol #m−2 of the even-numbered slot in the subframe #n or #n+5, when the cell is a new type cell.

2. The method according to claim 1, wherein the first and second PSSs and the first and second SSSs are located on 6 center resource blocks in a frequency domain, when the cell is the legacy type cell, and
    the first and second PSSs and the first and second SSSs are located on 6 resource blocks other than the 6 center resource blocks in the frequency domain, when the cell is the new type cell.

3. The method according to claim 1, wherein the first PSS is located on one of OFDM symbols #1 and #2 among OFDM symbols #0 to #m−1 of an odd-numbered slot of the subframe #n, the first SSS is located on another one of the OFDM symbols #1 and #2 of the odd-numbered slot of the subframe #n, the second PSS is located on one of OFDM symbols #1 and #2 among OFDM symbols #0 to #m−1 of an odd-numbered slot of the subframe #n+5 and the first SSS is located on another one of the OFDM symbols #1 and #2 of the odd-numbered slot of the subframe #n+5, when the cell is the new type carrier and a duplex mode of the cell is frequency division duplex.

4. The method according to claim 1, wherein, when the cell is the new type cell, the first PSS is located on the OFDM symbol #m−1 of the even-numbered slot of the subframe #n, the first SSS is located on the OFDM symbol #m−2 of the even-numbered slot of the subframe #n, the second PSS is located on an OFDM symbol #m−2 of the even-numbered slot of the subframe #n+5 and the second SSS is located on the OFDM symbol #m−1 of the even-numbered slot of the subframe #n+5, when the cell is the legacy type cell.

5. The method according to claim 1, wherein, when the cell is the new type cell, the first PSS is located on the OFDM symbol #m−2 of the even-numbered slot of the subframe #n, the first SSS is located on the OFDM symbol #m−1 of the even-numbered slot of the subframe #n, the second PSS is located on an OFDM symbol #m−2 of the even-numbered slot of the subframe #n+5 and the second SSS is located on the OFDM symbol #m−1 of the even-numbered slot of the subframe #n+5, when the cell is the legacy type cell.

6. A user equipment for receiving a synchronization signal, the user equipment comprising:
    a radio frequency unit; and
    a processor configured to control the radio frequency unit, the processor configured to:
    detect a first primary synchronization signal (PSS) and a first secondary synchronization signal (SSS) in a subframe #n;
    detect a second PSS and a second SSS in a subframe #n+5;
    acquire synchronization with a cell carrying the first and second PSSs and the first and second SSSs based on the first and second PSSs and the first and second SSSs,
    wherein the first PSS is located on an OFDM symbol #m−1 among OFDM symbols #0 to #m−1 of an even-numbered slot of the subframe #n, the first SSS is located on an OFDM symbol #m−2 of the even-numbered slot of the subframe #n, the second PSS is located on an OFDM symbol #m−1 among OFDM symbols #0 to #m−1 of an even-numbered slot of the subframe #n+5 and the second SSS is located on an OFDM symbol #m−2 of the even-numbered slot of the subframe #n+5, when the cell is a legacy type cell, and
    wherein at least the first PSS or second PSS is located on an OFDM symbol other than the OFDM symbol #m−1 of the even-numbered slot in the subframe #n or #n+5 and at least the first or second SSS is located on another OFDM symbol other than the OFDM symbol #m−2 of the even-numbered slot in the subframe #n or #n+5, when the cell is a new type cell.

7. The user equipment according to claim 6, wherein the first and second PSSs and the first and second SSSs are located on 6 center resource blocks in a frequency domain, when the cell is the legacy type cell, and
    the first and second PSSs and the first and second SSSs are located on 6 resource blocks other than the 6 center resource blocks in the frequency domain, when the cell is the new type cell.

8. The user equipment according to claim 6, wherein the first PSS is located on one of OFDM symbols #1 and #2 among OFDM symbols #0 to #m−1 of an odd-numbered slot of the subframe #n, the first SSS is located on another one of the OFDM symbols #1 and #2 of the odd-numbered slot of the subframe #n, the second PSS is located on one of OFDM symbols #1 and #2 among OFDM symbols #0 to #m−1 of an odd-numbered slot of the subframe #n+5 and the first SSS is located on another one of the OFDM symbols #1 and #2 of the odd-numbered slot of the subframe #n+5, when the cell is the new type carrier and a duplex mode of the cell is frequency division duplex.

9. The user equipment according to claim 6, wherein, when the cell is the new type cell, the first PSS is located on the OFDM symbol #m−1 of the even-numbered slot of the subframe #n, the first SSS is located on the OFDM symbol #m−2 of the even-numbered slot of the subframe #n, the second PSS is located on an OFDM symbol #m−2 of the even-numbered slot of the subframe #n+5 and the second SSS is located on the OFDM symbol #m−1 of the even-numbered slot of the subframe #n+5, when the cell is the legacy type cell.

10. The user equipment according to claim 6, wherein, when the cell is the new type cell, the first PSS is located on the OFDM symbol #m−2 of the even-numbered slot of the subframe #n, the first SSS is located on the OFDM symbol m−1 of the even-numbered slot of the subframe #n, the second PSS is located on an OFDM symbol #m−2 of the even-numbered slot of the subframe #n+5 and the second SSS is located on the OFDM symbol #m−1 of the even-numbered slot of the subframe #n+5, when the cell is the legacy type cell.

11. A method for transmitting a synchronization signal by a base station, the method comprising:
transmitting a first primary synchronization signal (PSS) and a first secondary synchronization signal (SSS) in a subframe #n through a cell; and
transmitting a second PSS and a second SSS in a subframe #n+5 through the cell,
wherein the first PSS is located on an OFDM symbol #m−1 among OFDM symbols #0 to #m−1 of an even-numbered slot of the subframe #n, the first SSS is located on an OFDM symbol #m−2 of the even-numbered slot of the subframe #n, the second PSS is located on an OFDM symbol #m−1 among OFDM symbols #0 to #m−1 of an even-numbered slot of the subframe #n+5 and the second SSS is located on an OFDM symbol #m−2 of the even-numbered slot of the subframe #n+5, when the cell is a legacy type cell, and
at least the first PSS or second PSS is located on an OFDM symbol other than the OFDM symbol #m−1 of the even-numbered slot in the subframe #n or #n+5 and at least the first or second SSS is located on another OFDM symbol other than the OFDM symbol #m−2 of the even-numbered slot in the subframe #n or #n+5, when the cell is a new type cell.

12. The method according to claim 11, wherein the first and second PSSs and the first and second SSSs are located on 6 center resource blocks in a frequency domain, when the cell is the legacy type cell, and
the first and second PSSs and the first and second SSSs are located on 6 resource blocks other than the 6 center resource blocks in the frequency domain, when the cell is the new type cell.

13. The method according to claim 11, wherein the first PSS is located on one of OFDM symbols #1 and #2 among OFDM symbols #0 to #m−1 of an odd-numbered slot of the subframe #n, the first SSS is located on another one of the OFDM symbols #1 and #2 of the odd-numbered slot of the subframe #n, the second PSS is located on one of OFDM symbols #1 and #2 among OFDM symbols #0 to #m−1 of an odd-numbered slot of the subframe #n+5 and the first SSS is located on another one of the OFDM symbols #1 and #2 of the odd-numbered slot of the subframe #n+5, when the cell is the new type carrier and a duplex mode of the cell is frequency division duplex.

14. The method according to claim 11, wherein, when the cell is the new type cell, the first PSS is located on the OFDM symbol #m−1 of the even-numbered slot of the subframe #n, the first SSS is located on the OFDM symbol #m−2 of the even-numbered slot of the subframe #n, the second PSS is located on an OFDM symbol #m−2 of the even-numbered slot of the subframe #n+5 and the second SSS is located on the OFDM symbol #m−1 of the even-numbered slot of the subframe #n+5, when the cell is the legacy type cell.

15. The method according to claim 11, wherein, when the cell is the new type cell, the first PSS is located on the OFDM symbol #m−2 of the even-numbered slot of the subframe #n, the first SSS is located on the OFDM symbol #m−1 of the even-numbered slot of the subframe #n, the second PSS is located on an OFDM symbol #m−2 of the even-numbered slot of the subframe #n+5 and the second SSS is located on the OFDM symbol #m−1 of the even-numbered slot of the subframe #n+5, when the cell is the legacy type cell.

16. A base station for transmitting a synchronization signal, the base station comprising:
a radio frequency unit; and
a processor configured to control the radio frequency unit, the processor configured to:
control the radio frequency unit to transmit a first primary synchronization signal (PSS) and a first secondary synchronization signal (SSS) in a subframe #n through a cell; and
control the radio frequency unit to transmit a second PSS and a second SSS in a subframe #n+5 through the cell,
wherein the first PSS is located on an OFDM symbol #m−1 among OFDM symbols #0 to #m−1 of an even-numbered slot of the subframe #n, the first SSS is located on an OFDM symbol #m−2 of the even-numbered slot of the subframe #n, the second PSS is located on an OFDM symbol #m−1 among OFDM symbols #0 to #m−1 of an even-numbered slot of the subframe #n+5 and the second SSS is located on an OFDM symbol #m−2 of the even-numbered slot of the subframe #n+5, when the cell is a legacy type cell, and
at least the first PSS or second PSS is located on an OFDM symbol other than the OFDM symbol #m−1 of the even-numbered slot in the subframe #n or #n+5 and at least the first or second SSS is located on another OFDM symbol other than the OFDM symbol #m−2 of the even-numbered slot in the subframe #n or #n+5, when the cell is a new type cell.

17. The base station according to claim 16, wherein the first and second PSSs and the first and second SSSs are located on 6 center resource blocks in a frequency domain, when the cell is the legacy type cell, and
the first and second PSSs and the first and second SSSs are located on 6 resource blocks other than the 6 center resource blocks in the frequency domain, when the cell is the new type cell.

18. The base station according to claim 16, wherein the first PSS is located on one of OFDM symbols #1 and #2 among OFDM symbols #0 to #m−1 of an odd-numbered slot of the subframe #n, the first SSS is located on another one of the OFDM symbols #1 and #2 of the odd-numbered slot of the subframe #n, the second PSS is located on one of OFDM symbols #1 and #2 among OFDM symbols #0 to #m−1 of an odd-numbered slot of the subframe #n+5 and the first SSS is located on another one of the OFDM symbols #1 and #2 of the odd-numbered slot of the subframe #n+5, when the cell is the new type carrier and a duplex mode of the cell is frequency division duplex.

19. The base station according to claim 16, wherein, when the cell is the new type cell, the first PSS is located on the OFDM symbol #m−1 of the even-numbered slot of the subframe #n, the first SSS is located on the OFDM symbol #m−2 of the even-numbered slot of the subframe #n, the second PSS is located on an OFDM symbol #m−2 of the even-numbered slot of the subframe #n+5 and the second SSS is located on the OFDM symbol #m−1 of the even-numbered slot of the subframe #n+5, when the cell is the legacy type cell.

20. The base station according to claim 16, wherein, when the cell is the new type cell, the first PSS is located on the OFDM symbol #m−2 of the even-numbered slot of the subframe #n, the first SSS is located on the OFDM symbol #m−1 of the even-numbered slot of the subframe #n, the second PSS is located on an OFDM symbol #m−2 of the even-numbered slot of the subframe #n+5 and the second SSS is located on the OFDM symbol #m−1 of the even-numbered slot of the subframe #n+5, when the cell is the legacy type cell.

* * * * *